(12) United States Patent
Hada et al.

(10) Patent No.: US 9,575,343 B2
(45) Date of Patent: Feb. 21, 2017

(54) METHOD FOR CONTINUOUSLY PRODUCING OPTICAL DISPLAY PANEL, AND SYSTEM FOR CONTINUOUSLY PRODUCING OPTICAL DISPLAY PANEL

(75) Inventors: Kazuya Hada, Ibaraki (JP); Satoshi Hirata, Ibaraki (JP); Seiji Kondo, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 390 days.

(21) Appl. No.: 14/117,796

(22) PCT Filed: May 2, 2012

(86) PCT No.: PCT/JP2012/061601
§ 371 (c)(1),
(2), (4) Date: Nov. 14, 2013

(87) PCT Pub. No.: WO2012/160953
PCT Pub. Date: Nov. 29, 2012

(65) Prior Publication Data
US 2014/0090779 A1      Apr. 3, 2014

(30) Foreign Application Priority Data

May 29, 2011 (JP) .................................. 2011-113729
Mar. 28, 2012 (JP) .................................. 2012-075230

(51) Int. Cl.
*G02F 1/13* (2006.01)
*G02F 1/1333* (2006.01)
(Continued)

(52) U.S. Cl.
CPC ............. *G02F 1/1333* (2013.01); *B32B 37/02* (2013.01); *G02F 1/1303* (2013.01);
(Continued)

(58) Field of Classification Search
CPC .................. G02F 1/1303; G02F 1/1333; Y10T 156/1062; Y10T 156/12
See application file for complete search history.

(56) References Cited

U.S. PATENT DOCUMENTS 6,095,220 A   8/2000   Kobayashi et al.
8,568,873 B2  10/2013  Kusama et al.
(Continued)

FOREIGN PATENT DOCUMENTS

CN   1484048 A     3/2004
CN   101868813 A  10/2010
(Continued)

OTHER PUBLICATIONS

Korean Office Action dated Jul. 21, 2014, issued in related Korean Patent Application No. 10-2013-7022578, w/ English translation (21 pages).
(Continued)

*Primary Examiner* — Mark A Osele
*Assistant Examiner* — Christopher C Caillouet
(74) *Attorney, Agent, or Firm* — Westerman, Hattori, Daniels & Adrian, LLP

(57) ABSTRACT

A method includes a first bonding step including providing a first polarizing film obtained by transversely cutting a first long polarizing film having an absorption axis in its longitudinal direction, supplying the first polarizing film from a first optical film roll, and bonding the first polarizing film to a back side of the optical cell while feeding the optical cell; and a second bonding step including providing a linearly polarized light separating film obtained by transversely cutting a long linearly polarized light separating film having a reflection axis in its transverse direction, supplying the linearly polarized light separating film from a second optical film roll, and bonding the linearly polarized light separating (Continued)

film onto the first polarizing film bonded to the back side of the optical cell, while feeding the optical cell.

15 Claims, 18 Drawing Sheets

(51) Int. Cl.
*G02F 1/1335* (2006.01)
*B32B 37/02* (2006.01)
*G02B 5/30* (2006.01)

(52) U.S. Cl.
CPC .... *G02F 1/133528* (2013.01); *B32B 2457/20* (2013.01); *G02B 5/3033* (2013.01); *Y10T 156/1062* (2015.01); *Y10T 156/12* (2015.01)

(56) References Cited

U.S. PATENT DOCUMENTS

| | | | |
|---|---|---|---|
| 2003/0086169 A1 | 5/2003 | Kawamoto et al. | |
| 2005/0016670 A1 | 1/2005 | Kanbara et al. | |
| 2005/0248846 A1 | 11/2005 | Sakamaki | |
| 2006/0124248 A1 | 6/2006 | Kanbara et al. | |
| 2006/0246232 A1 | 11/2006 | Kubo et al. | |
| 2006/0291054 A1 | 12/2006 | Tomoguchi | |
| 2008/0043332 A1 | 2/2008 | Chiba et al. | |
| 2009/0128745 A1 | 5/2009 | Ikeda et al. | |
| 2009/0218049 A1 | 9/2009 | Kanbara et al. | |
| 2009/0260738 A1 | 10/2009 | Kitada et al. | |
| 2009/0263608 A1 | 10/2009 | Kitada et al. | |
| 2010/0157195 A1 | 6/2010 | Miyatake et al. | |
| 2010/0186890 A1* | 7/2010 | Kitada ................. | B32B 38/185 156/256 |
| 2010/0206977 A1 | 8/2010 | Kitada et al. | |
| 2010/0212822 A1 | 8/2010 | Kitada et al. | |
| 2010/0258250 A1 | 10/2010 | Kitada et al. | |
| 2010/0277676 A1 | 11/2010 | Uwada et al. | |
| 2010/0282406 A1 | 11/2010 | Kitada et al. | |
| 2010/0294418 A1 | 11/2010 | Yura et al. | |
| 2010/0300606 A1 | 12/2010 | Kitada et al. | |
| 2010/0300611 A1 | 12/2010 | Yamamoto et al. | |
| 2011/0025958 A1 | 2/2011 | Koshio et al. | |
| 2011/0047775 A1* | 3/2011 | Koshio ................. | B32B 37/182 29/428 |
| 2011/0051062 A1 | 3/2011 | Sakai | |
| 2011/0059327 A1 | 3/2011 | Takeda et al. | |
| 2011/0104423 A1 | 5/2011 | Kitada et al. | |
| 2011/0111667 A1 | 5/2011 | Kitada et al. | |
| 2011/0126988 A1 | 6/2011 | Kitada et al. | |
| 2012/0291945 A1 | 11/2012 | Hada et al. | |
| 2012/0312462 A1 | 12/2012 | Hirata et al. | |
| 2013/0037219 A1 | 2/2013 | Kitada et al. | |
| 2013/0044374 A1 | 2/2013 | Kitada et al. | |
| 2013/0045350 A1 | 2/2013 | Kitada et al. | |
| 2013/0168016 A1 | 7/2013 | Kitada et al. | |
| 2014/0085723 A1 | 3/2014 | Hada et al. | |

FOREIGN PATENT DOCUMENTS

| | | |
|---|---|---|
| CN | 102046374 A | 5/2011 |
| CN | 102057415 A | 5/2011 |
| EP | 2 293 271 A1 | 3/2011 |
| JP | 2002-189431 A | 7/2002 |
| JP | 2002-196141 A | 7/2002 |
| JP | 2004-250213 A | 9/2004 |
| JP | 2004-262071 A | 9/2004 |
| JP | 2004-361741 A | 12/2004 |
| JP | 2005-37417 A | 2/2005 |
| JP | 2005-300877 A | 10/2005 |
| JP | 2005-345958 A | 12/2005 |
| JP | 2008-003188 A | 1/2008 |
| JP | 2009-009062 A | 1/2009 |
| JP | 2009-109602 A | 5/2009 |
| JP | 2009-157361 A | 7/2009 |
| JP | 4307510 B1 | 8/2009 |
| JP | 2009-271516 A | 11/2009 |
| JP | 2009-271520 A | 11/2009 |
| JP | 2009-276757 A | 11/2009 |
| JP | 2009-282385 A | 12/2009 |
| JP | 4406043 B2 | 1/2010 |
| JP | 2010-256757 A | 11/2010 |
| JP | 2011-81421 A | 4/2011 |
| JP | 2012-128409 A | 7/2012 |
| KR | 10-2011-0011689 A | 2/2011 |
| TW | 200933216 A | 8/2009 |
| WO | 2009/072469 A1 | 6/2009 |
| WO | 2009/128416 A1 | 10/2009 |
| WO | 2010/131597 A1 | 11/2010 |
| WO | 2012/070485 A1 | 5/2012 |

OTHER PUBLICATIONS

International Search Report for PCT/JP2012/061818, Mailing Date of Jun. 12, 2012.
Notification of Transmittal of Translation of the International Preliminary Report on Patentability (Form PCT/IB/338) of International Application No. PCT/JP2012/061818 mailed Nov. 28, 2013 with Forms PCT/IB/373 and PCT/ISA/237.
U.S. Notice of Allowance dated Sep. 5, 2014, issued in U.S. Appl. No. 13/462,103 (16 pages).
Office Action dated Dec. 9, 2014, issued in related Japanese Patent Application No. 2011-128174, with English translation (6 pages).
U.S. Office Action dated Apr. 8, 2015, issued in co-pending U.S. Appl. No. 13/487,525, (25 pages).
Office Action dated Apr. 7, 2015, issued in corresponding Chinese Patent Application No. 201280024533.2 with English translation (46 pages).
Office Action dated Mar. 24, 2015, issued in corresponding Korean Patent Application No. 10-2013-7022578 with English translation (10 pages).
Office Action dated May 21, 2015, issued in related U.S. Appl. No. 14/118,013 (22 pages).
Office Action dated Aug. 25, 2015, issued in counterpart Japanese application No. 2012-093052 (w/English translation) (4 pages).
Notice of Allowance dated Jul. 20, 2015, issued in counterpart Korean application No. 10-2013-7022578 (2 pages).
Office Action dated Sep. 25, 2015, issued in counterpart Japanese patent Application No. 2012-062116, with English translation. ( 4 pages).
Office Action dated Sep. 22, 2015, issued in counterpart Chinese patent Application No. 201210183317.4, with English translation. ( 16 pages).
Search Report dated Nov. 9, 2015, issued in counterpart Taiwanese Patent Application No. 101117273, w/ English translation (4 pages).
Final Office Action dated Nov. 5, 2015, issued in U.S. Appl. No. 13/487,525 (27 pages).
International Search Report for PCT/JP2012/061601, Mailing Date of Aug. 14, 2012.
Notification of Transmittal of Translation of International Preliminary Report on Patentability (Form PCT/IB/338) of International Application No. PCT/JP2012/061601 mailed Nov. 28, 2013 with Forms PCT/IB/373 and PCT/ISA/237.
Office Action dated Nov. 30, 2015, issued in Taiwanese Patent Application No. 101117263, w/English translation (11 pages).
Non-Final Office Action dated Apr. 11, 2016, issued in U.S. Appl. No. 13/487,525 (15 pages).
Office Action dated Apr. 6, 2016, issued in counterpart Taiwanese Patent Application No. 101120345, with English ranslation. (9 pages).
Office Action dated Sep. 20, 2016, issued in counterpart Japanese Patent Application No. 2016-017305, with English translation. (6 pages).
Office Action dated Oct. 14, 2016, issued in counterpart Taiwanese Application No. 101117471, with English translation of Search Report (4 pages).

* cited by examiner

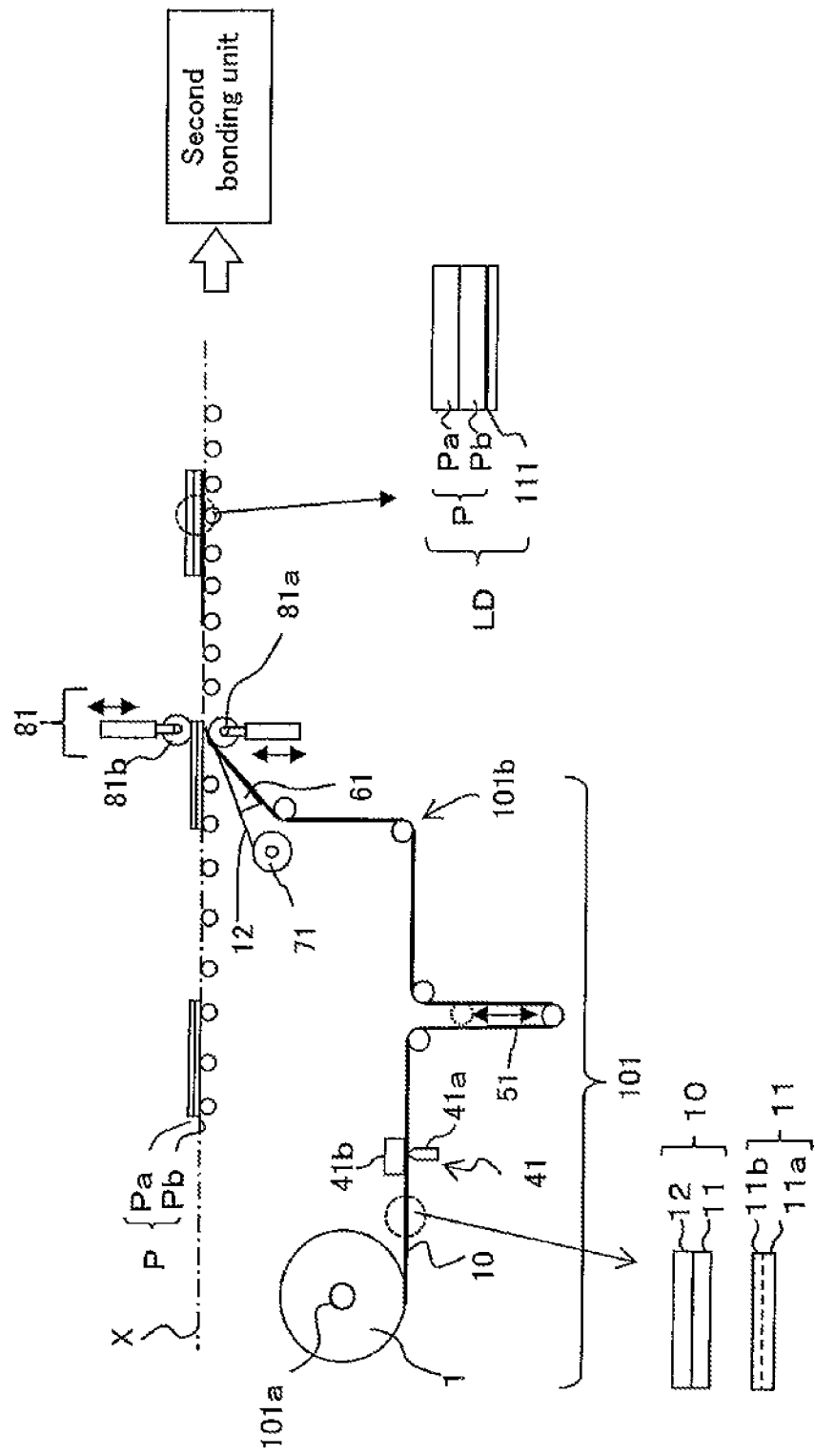

Bonding to the viewer side of the liquid crystal cell (bonding along the direction of the long side of the liquid crystal cell)

S22

Bonding to the back side of the liquid crystal cell (bonding along the direction of the short side of the liquid crystal cell)

S23

Bonding to the back side of the liquid crystal cell (bonding along the direction of the long side of the liquid crystal cell)

Bonding to the viewer side of the liquid crystal cell (bonding along the direction of the long side of the liquid crystal cell)

S42

Bonding to the back side of the liquid crystal cell (bonding along the direction of the short side of the liquid crystal cell)

S43

Bonding to the back side of the liquid crystal cell (bonding along the direction of the short side of the liquid crystal cell)

Bonding to the back side of the liquid
crystal cell (bonding along the direction of
the short side of the liquid crystal cell)

S52

Bonding to the back side of the liquid
crystal cell (bonding along the direction of
the short side of the liquid crystal cell)

S53

Bonding to the viewer side of the liquid
crystal cell (bonding along the direction of
the long side of the liquid crystal cell)

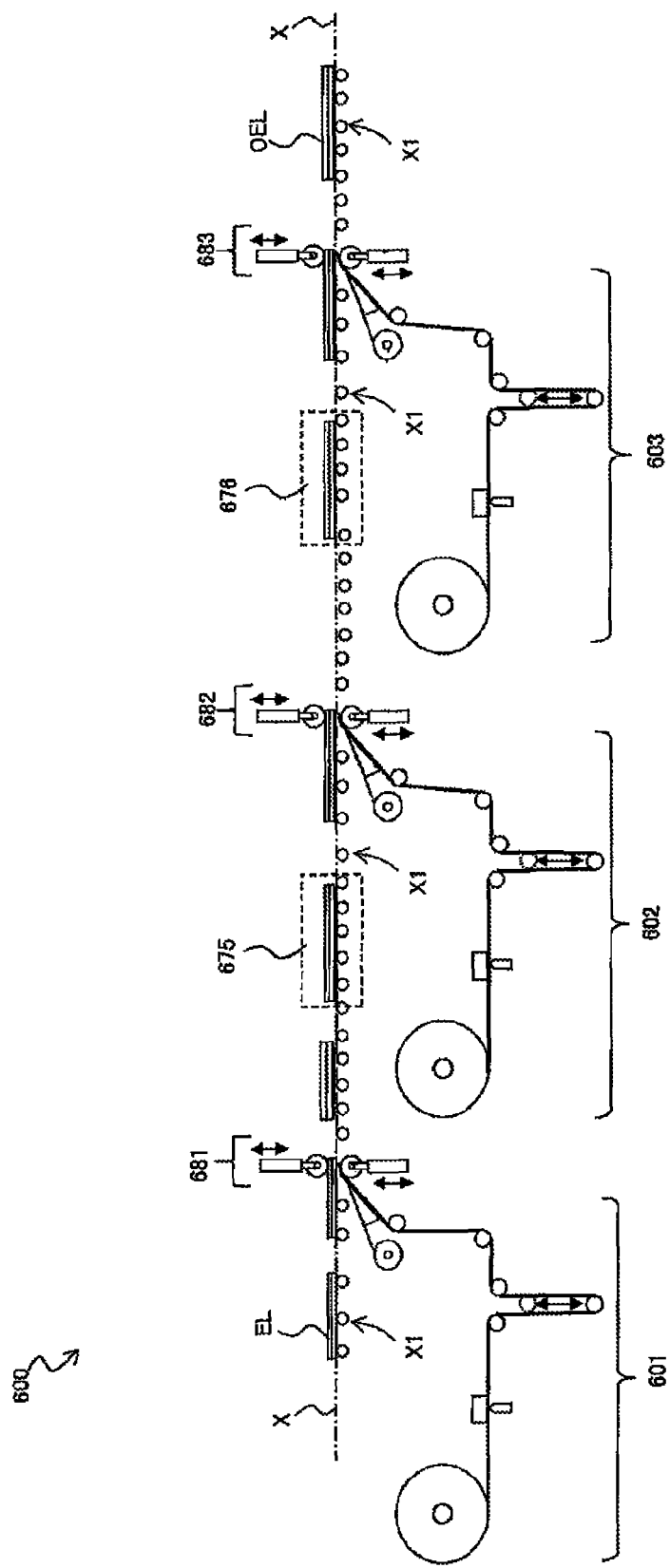

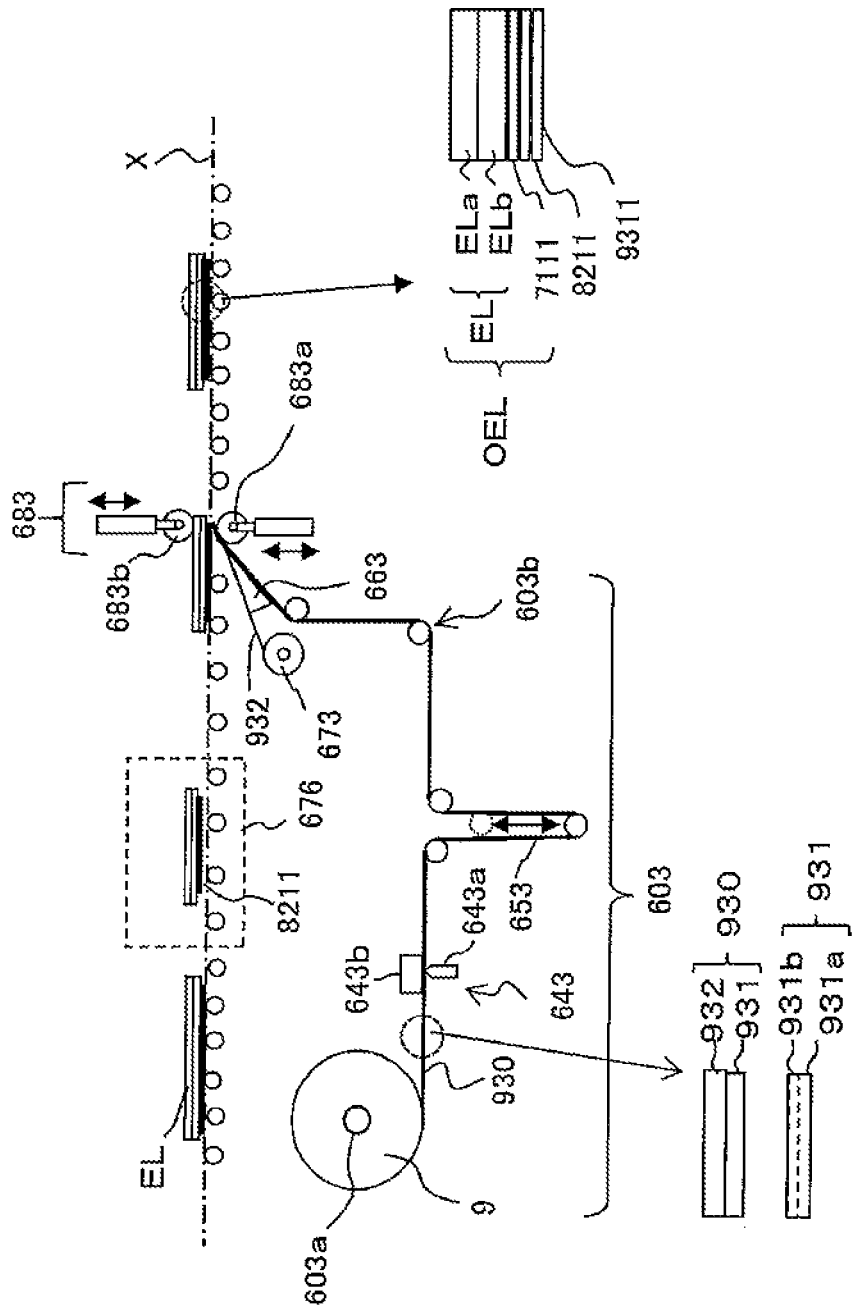

METHOD FOR CONTINUOUSLY PRODUCING OPTICAL DISPLAY PANEL, AND SYSTEM FOR CONTINUOUSLY PRODUCING OPTICAL DISPLAY PANEL

TECHNICAL FIELD

The invention relates to a method for continuously manufacturing an optical display panel and a system for continuously manufacturing an optical display panel.

BACKGROUND ART

There is disclosed a method for continuously manufacturing a liquid crystal display panel, which includes unwinding, from a first optical film roll, a first long polarizing film having an absorption axis in the longitudinal direction; transversely cutting the first long polarizing film to form a first polarizing film; bonding the resulting first polarizing film to the back side of a liquid crystal cell; unwinding, from a second optical film roll, a second long polarizing film having an absorption axis in the longitudinal direction; transversely cutting the second long polarizing film to form a second polarizing film; bonding the resulting second polarizing film to the viewer side of the liquid crystal cell (what is called a Roll to Panel (RTP) system) (see for example Patent Document 1). The RTP system makes possible high-speed continuous production of liquid crystal display panels.

There is also disclosed a liquid crystal display panel with high light use efficiency, which includes a liquid crystal cell, a first optical film including a polarizing film bonded to the viewer side of the liquid crystal cell, and a second optical film bonded to the back side of the liquid crystal cell, wherein the second optical film includes a polarizing film and a linearly polarized light separating film laminated in this order (see for example Patent Document 2). There has also been a demand for high-speed continuous production of liquid crystal display panels with such a structure.

PRIOR ART DOCUMENTS

Patent Documents

Patent Document 1: Japanese Patent No. 4406043
Patent Document 2: JP-A-2002-196141
Patent Document 3: JP-A-2004-250213

SUMMARY OF THE INVENTION

Problems to be Solved by the Invention

In general, however, the transmission axes of a polarizing film and a linearly polarized light separating film are perpendicular to each other. Specifically, a polarizing film usually has an absorption axis in the longitudinal direction, and a linearly polarized light separating film usually has a reflection axis in the transverse direction. Thus, such a polarizing film and such a linearly polarized light separating film are not able to be continuously laminated in the form of long strips by Roll to Roll method or the like, and rolls of such optical films are not producible for the RTP system.

For example, it can be considered that with reference to the method described in Patent Document 3, an optical film roll can be manufactured by a process including placing cut pieces of linearly polarized light separating film of a determined size on a long polarizing film being unwound from a polarizing film roll and then winding the resulting laminate as it is without cutting it into pieces, and then subjected to the RTP system. In this case, however, as shown in FIG. 8, a part (boundary region) F having a certain area where the piece of linearly polarized light separating film 902 is not placed necessarily occurs in the long polarizing film 901, so that a significant decrease in yield will be inevitable. On the other hand, if it is tried to bond the films with high precision so that the boundary region F can be as small as possible, the tact time will be significantly sacrificed. In addition, when the piece of linearly polarized light separating film 902 is placed on the long polarizing film 901, the piece of linearly polarized light separating film 902 is supplied in a direction perpendicular to the direction in which it is bonded to the long polarizing film 901. Thus, the piece of linearly polarized light separating film 902 cannot be smoothly bonded as it is to the long polarizing film 901, which will also cause a problem with high-speed productivity.

This is a new problem that occurs not only in the manufacture of a liquid crystal display panel including a liquid crystal cell, and the polarizing film and the linearly polarized light separating film which are placed on the back side of the liquid crystal cell, but also in the high-speed continuous production of an optical display panel including an optical cell and optical films placed on one side of the optical cell, in which the optical films are usually not able to be subjected, in the form of long strips, to a continuous lamination process.

The invention has been made in view of the above problems, and an object of the invention is to provide a set of optical film rolls suitable for use in high-yield, high-speed, continuous production of optical display panels each having an optical cell and optical films laminated to one side of the optical cell, wherein the optical films are not able to be continuously laminated in the form of long strips, and to provide a method for manufacturing such a set of optical film rolls.

Means for Solving the Problems

The invention is directed to a method for continuously manufacturing an optical display panel comprising an optical cell, and a first polarizing film and a linearly polarized light separating film which are placed in this order on a back side of the optical cell, the method includes:

a first bonding step comprising providing a first polarizing film obtained by transversely cutting a first long polarizing film having an absorption axis in its longitudinal direction, supplying the first polarizing film from a first optical film roll, and bonding the first polarizing film to a back side of the optical cell while feeding the optical cell, wherein bonding the first polarizing film is started from one of a pair of opposite sides of the optical cell and performed along a direction in which the first polarizing film is supplied; and a second bonding step comprising providing a linearly polarized light separating film obtained by transversely cutting a long linearly polarized light separating film having a reflection axis in its transverse direction, supplying the linearly polarized light separating film from a second optical film roll, and bonding the linearly polarized light separating film onto the first polarizing film bonded to the back side of the optical cell, while feeding the optical cell, wherein bonding the linearly polarized light separating film is started from one of another pair of opposite sides of the optical cell and performed along a direction in which the linearly polarized light separating film is supplied.

According to this feature, the first polarizing film and the linearly polarized light separating film, which are not able to be continuously laminated in the form of long strips, can be each continuously supplied from a roll, each bonded to the optical cell along the original direction in which each film is supplied from each roll, and bonded, in directions relatively perpendicular to each other, to the optical cell, so that they can be continuously laminated to the back side of the optical cell at high speed and high yield. This makes possible high-yield, high-speed, continuous production of optical display panels with high light use efficiency, each having the first polarizing film and the linearly polarized light separating film laminated in a proper arrangement relationship to the back side of the optical cell.

In an embodiment of the invention, the method further includes: an orientation changing step between the first bonding step and the second bonding step, the orientation changing step comprising interchanging the direction of a pair of opposite sides of the optical cell and the direction of another pair of opposite sides of the optical cell relative to a direction in which the optical cell is fed.

According to this feature, the first polarizing film and the linearly polarized light separating film can be bonded, in directions relatively perpendicular to each other, to the optical cell without arranging the long first polarizing film feed line and the long linearly polarized light separating film feed line perpendicular to each other, so that the space required for the apparatus can be reduced.

In the present context, the optical cell is generally fed in a direction parallel to either a pair of opposite sides of the optical cell or another pair of opposite sides of the optical cell. Examples of the method of interchanging the direction of a pair of opposite sides of the optical cell and the direction of another pair of opposite sides of the optical cell include, but are not limited to, (1) a method of horizontally rotating the optical cell by 90°, (2) a method of horizontally rotating the optical cell by 90° and turning over the optical cell about an in-cell-plane rotation axis parallel or perpendicular to the feed direction (the rotation and the turnover may be performed in any order), and (3) a method of turning over the optical cell about an in-cell-plane rotation axis making an angle of 45 degrees with the feed direction.

In an embodiment of the invention, the method further includes a third bonding step comprising providing a second polarizing film obtained by transversely cutting a second long polarizing film having an absorption axis in its longitudinal direction, supplying the second polarizing film from a third optical film roll, and bonding the second polarizing film to a viewer side of the optical cell while feeding the optical cell, wherein bonding the second polarizing film is started from one of another pair of opposite sides of the optical cell and performed along a direction in which the second polarizing film is supplied.

This feature makes possible high-yield, high-speed, continuous production of high-contrast optical display panels in which the absorption axes of the viewer side polarizing film and the back side polarizing film are perpendicular to each other.

In an embodiment of the invention, the method further includes a third bonding step comprising taking and supplying a second polarizing film from a container containing pieces of second polarizing film and bonding the second polarizing film to a viewer side of the optical cell while feeding the optical cell, wherein bonding the second polarizing film is performed along a direction in which the second polarizing film is supplied.

This feature makes possible high-yield, continuous production of high-contrast optical display panels in which the absorption axes of the viewer side polarizing film and the back side polarizing film are perpendicular to each other. In this case, the second polarizing film may be bonded in a direction from one to the other of a pair of opposite sides of the optical cell similarly to the first polarizing film or in a direction from one to the other of another pair of opposite sides of the optical cell similarly to the linearly polarized light separating film, as long as the second polarizing film is bonded along the second polarizing film supply direction to the optical cell in such a manner that the absorption axes of the first polarizing film on the back side and the second polarizing film on the viewer side are perpendicular to each other.

In an embodiment of the invention, the first polarizing film, the linearly polarized light separating film, and the second polarizing film are supplied in directions parallel to one another.

According to this feature, the lines for feeding the first polarizing film, the linearly polarized light separating film, and the second polarizing film are arranged parallel to one another, so that the space occupied by the apparatus can be reduced. Examples of the configuration in which the lines for feeding the first polarizing film, the linearly polarized light separating film, and the second polarizing film are arranged parallel to one another include not only a configuration in which these feed lines are arranged in a straight line but also a configuration in which these feed lines are not arranged in a straight line but arranged parallel to one another. Preferably, at least two of these three feed lines are arranged in a straight line.

In an embodiment of the invention, the optical cell is a VA or IPS mode liquid crystal cell.

The invention is particularly advantageous for high-yield, high-speed, continuous production of high-contrast VA or IPS mode optical display panels.

The other invention is directed to a system for continuously manufacturing an optical display panel including an optical cell, and a first polarizing film and a linearly polarized light separating film which are placed in this order on a back side of the optical cell, the system includes:

a series of feed units for feeding the optical cell and the optical display panel;

a first optical film supply unit for supplying a first polarizing film from a first optical film roll, wherein the first polarizing film is obtained by transversely cutting a first long polarizing film having an absorption axis in its longitudinal direction;

a first bonding unit for bonding the first polarizing film to a back side of the optical cell while feeding the optical cell fed by the feed units, wherein the first polarizing film is supplied by the first optical film supply unit, and bonding the first polarizing film is started from one of a pair of opposite sides of the optical cell and performed along a direction in which the first polarizing film is supplied;

a second optical film supply unit for supplying a linearly polarized light separating film from a second optical film roll, wherein the linearly polarized light separating film is obtained by transversely cutting a long linearly polarized light separating film having a reflection axis in its transverse direction; and a second bonding unit for bonding the linearly polarized light separating film onto the first polarizing film bonded to the back side of the optical cell, while feeding the optical cell fed by the feed units, wherein the linearly polarized light separating film is supplied by the second optical film supply unit, and bonding the linearly polarized light separating film is started from one of another pair of opposite sides of the optical cell and performed along a direction in which the linearly polarized light separating film is supplied.

According to this feature, the first polarizing film and the linearly polarized light separating film, which are not able to be continuously laminated in the form of long strips, can be each continuously supplied from a roll, each bonded to the optical cell along the original direction in which each film is supplied from each roll, and bonded, in directions relatively perpendicular to each other, to the optical cell, so that they can be continuously laminated to the back side of the optical cell at high speed and high yield. This makes possible high-yield, high-speed, continuous production of optical display panels with high light use efficiency, each having the first polarizing film and the linearly polarized light separating film laminated in a proper arrangement relationship to the back side of the optical cell.

In an embodiment of the invention, the feed units further includes an orientation changing unit for interchanging the direction of a pair of opposite sides of the optical cell and the direction of another pair of opposite sides of the optical cell relative to a direction in which the optical cell is fed, wherein the orientation changing unit is provided between the first bonding unit and the second bonding unit.

According to this feature, the first polarizing film and the linearly polarized light separating film can be bonded, in directions relatively perpendicular to each other, to the optical cell without arranging the long first polarizing film feed line and the long linearly polarized light separating film feed line perpendicular to each other, so that the space required for the apparatus can be reduced.

In an embodiment of the invention, the system further includes:

a third optical film supply unit for supplying a second polarizing film from a third optical film roll, wherein the second polarizing film is obtained by transversely cutting a second long polarizing film having an absorption axis in its longitudinal direction; and a third bonding unit for bonding the second polarizing film to a viewer side of the optical cell while feeding the optical cell fed by the feed units, wherein the second polarizing film is supplied by the third optical film supply unit, and bonding the second polarizing film is started from one of another pair of opposite sides of the optical cell and performed along a direction in which the second polarizing film is supplied.

This feature makes possible high-yield, high-speed, continuous production of high-contrast optical display panels in which the absorption axes of the viewer side polarizing film and the back side polarizing film are perpendicular to each other.

In an embodiment of the invention, the system further includes:

a third optical film supply unit for taking and supplying a second polarizing film from a container containing pieces of second polarizing film; and a third bonding unit for bonding the second polarizing film to a viewer side of the optical cell while feeding the optical cell fed by the feed units, wherein the second polarizing film is supplied by the third optical film supply unit, and bonding the second polarizing film is performed along a direction in which the second polarizing film is supplied.

This feature makes possible high-yield, continuous production of high-contrast optical display panels in which the absorption axes of the viewer side polarizing film and the back side polarizing film are perpendicular to each other. In this case, the second polarizing film may be bonded in a direction from one to the other of a pair of opposite sides of the optical cell similarly to the first polarizing film or in a direction from one to the other of another pair of opposite sides of the optical cell similarly to the linearly polarized light separating film, as long as the second polarizing film is bonded along the second polarizing film supply direction to the optical cell in such a manner that the absorption axes of the first polarizing film on the back side and the second polarizing film on the viewer side are perpendicular to each other.

In an embodiment of the invention, the first optical film supply unit, the second optical film supply unit, and the third optical film supply unit are so arranged as to supply the first polarizing film, the linearly polarized light separating film, and the second polarizing film in directions parallel to one another.

According to this feature, the lines for feeding the first polarizing film, the linearly polarized light separating film, and the second polarizing film are arranged parallel to one another, so that the space occupied by the apparatus can be reduced. Examples of the configuration in which the lines for feeding the first polarizing film, the linearly polarized light separating film, and the second polarizing film are arranged parallel to one another include not only a configuration in which these feed lines are arranged in a straight line but also a configuration in which these feed lines are not arranged in a straight line but arranged parallel to one another. Preferably, at least two of these three feed lines are arranged in a straight line.

In an embodiment of the invention, the optical cell is a VA or IPS mode liquid crystal cell.

The invention is particularly advantageous for high-yield, high-speed, continuous production of high-contrast VA or IPS mode optical display panels.

In the invention, bonding the first polarizing film to the optical cell is started from one of a pair of opposite sides of the optical cell. Thus, the first long polarizing film generally has a width corresponding to a pair of opposite sides of the optical cell. Bonding the linearly polarized light separating film to the optical cell is started from one of another pair of opposite sides of the optical cell. Thus, the long linearly polarized light separating film generally has a width corresponding to another pair of opposite sides of the optical cell. Bonding the second polarizing film to the optical cell is started from one of another pair of opposite sides of the optical cell. Thus, the second long polarizing film generally has a width corresponding to another pair of opposite sides of the optical cell.

The optical cell may have any shape such as a square or a rectangle as long as it is shaped to have a pair of opposite sides and another pair of opposite sides. In general, a pair of opposite sides of the optical cell is perpendicular to another pair of opposite sides of the optical cell.

The optical display panel and the optical cell each generally have a horizontally-long rectangular shape. In this case, the first long polarizing film generally has a width corresponding to the long side of the optical cell, the long linearly polarized light separating film generally has a width corresponding to the short side of the optical cell, and the second long polarizing film generally has a width corresponding to the short side of the optical cell.

Alternatively, the optical display panel and the optical cell may each have a vertically-long rectangular shape. In this case, the first long polarizing film generally has a width corresponding to the short side of the optical cell, the long linearly polarized light separating film generally has a width corresponding to the long side of the optical cell, and the second long polarizing film generally has a width corresponding to the long side of the optical cell.

The other invention is directed to a method for continuously manufacturing an optical display panel including an optical cell, and a first optical film and a second optical film which are placed in this order on one side of the optical cell, the method includes:

a first bonding step including providing a first optical film obtained by transversely cutting a first long optical film, supplying the first optical film from a first optical film roll, and bonding the first optical film to one side of the optical cell while feeding the optical cell, wherein bonding the first optical film is started from one of a pair of opposite sides of the optical cell and performed along a direction in which the first optical film is supplied; and a second bonding step including providing a second optical film obtained by transversely cutting a second long optical film, supplying the second optical film from a second optical film roll, and bonding the second optical film onto the first optical film bonded to the one side of the optical cell, while feeding the optical cell, wherein bonding the second optical film is started from one of another pair of opposite sides of the optical cell and performed along a direction in which the second optical film is supplied.

According to this feature, the first and second optical films, which are not able to be continuously laminated in the form of long strips, are each continuously supplied from a roll, each bonded to the optical cell along the original direction in which each film is supplied from each roll, and bonded, in directions relatively perpendicular to each other, to the optical cell, so that they can be continuously laminated to one side of the optical cell at high speed and high yield. This makes possible high-yield, high-speed, continuous production of optical display panels in which the first and second optical films are laminated in a proper arrangement relationship to one side of the optical cell.

In an embodiment of the invention, the method further includes: an orientation changing step between the first bonding step and the second bonding step, the orientation changing step comprising interchanging the direction of a pair of opposite sides of the optical cell and the direction of another pair of opposite sides of the optical cell relative to a direction in which the optical cell is fed.

According to this feature, the first optical film and the second optical film can be bonded, in directions relatively perpendicular to each other, to the optical cell without arranging the long first optical film feed line and the second long optical film feed line perpendicular to each other, so that the space required for the apparatus can be reduced.

In an embodiment of the invention, the first optical film and the second optical film are supplied in directions parallel to each other.

According to this feature, the lines for feeding the first optical film and the second optical film are arranged parallel to each other, so that the space occupied by the apparatus can be reduced. Examples of the configuration in which the lines for feeding the first optical film and the second optical film are arranged parallel to each other include not only a configuration in which these feed lines are arranged in a straight line but also a configuration in which these feed lines are not arranged in a straight line but arranged parallel to each other.

In an embodiment of the invention, the first long optical film is a long retardation film including a laminate of a long $\lambda/4$ retardation film having a slow axis in its longitudinal direction and a long $\lambda/2$ retardation film having a slow axis in a direction making an angle of 67.5 degrees with its longitudinal direction, and the second long optical film is a long polarizing film having an absorption axis in its longitudinal direction.

This feature makes possible high-yield, high-speed, continuous production of optical display panels each having a circularly polarizing film composed of a $\lambda/4$ retardation film, a $\lambda/2$ retardation film, and a polarizing film, which are laminated in this order in a proper arrangement relationship.

In an embodiment of the invention, the method further includes a fourth bonding step comprising providing a fourth optical film obtained by transversely cutting a long fourth optical film, supplying the fourth optical film from a fourth optical film roll, and bonding the fourth optical film onto the second optical film bonded to the one side of the optical cell, while feeding the optical cell, wherein bonding the fourth optical film is started from one of a pair of opposite sides of the optical cell and performed along a direction in which the fourth optical film is supplied.

According to this feature, the second and fourth optical films, which are not able to be continuously laminated in the form of long strips, are each continuously supplied from a roll, each bonded to the optical cell along the original direction in which each film is supplied from each roll, and bonded, in directions relatively perpendicular to each other, to the optical cell, so that they can be continuously laminated to one side of the optical cell at high speed and high yield. This makes possible high-yield, high-speed, continuous production of optical display panels in which the first, second, and fourth optical films are laminated in a proper arrangement relationship to one side of the optical cell.

In an embodiment of the invention, the method further includes a second orientation changing step between the second bonding step and the fourth bonding step, the second orientation changing step comprising interchanging the direction of a pair of opposite sides of the optical cell and the direction of another pair of opposite sides of the optical cell relative to a direction in which the optical cell is fed.

According to this feature, the second optical film and the fourth optical film can be bonded, in directions relatively perpendicular to each other, to the optical cell without arranging the second long optical film feed line and the long fourth optical film feed line perpendicular to each other, so that the space required for the apparatus can be reduced.

In an embodiment of the invention, the first optical film, the second optical film, and the fourth optical film are supplied in directions parallel to one another.

According to this feature, the lines for feeding the first optical film, the second optical film, and the fourth optical film are arranged parallel to one another, so that the space occupied by the apparatus can be reduced. Examples of the configuration in which the lines for feeding the first optical film, the second optical film, and the fourth optical film are arranged parallel to one another include not only a configuration in which these feed lines are arranged in a straight line but also a configuration in which these feed lines are not arranged in a straight line but arranged parallel to one another. Preferably, at least two of these three feed lines are arranged in a straight line.

In an embodiment of the invention, the first long optical film is a long $\lambda/4$ retardation film having a slow axis in its transverse direction, the second long optical film is a long $\lambda/2$ retardation film having a slow axis in a direction making an angle of 67.5 degrees with its longitudinal direction, and the long fourth optical film is a long polarizing film having an absorption axis in its longitudinal direction.

This feature makes possible high-yield, high-speed, continuous production of optical display panels each having a circularly polarizing film composed of a λ/4 retardation film, a λ/2 retardation film, and a polarizing film, which are laminated in this order in a proper arrangement relationship.

In an embodiment of the invention, the optical cell is a liquid crystal cell or an organic electroluminescent cell.

The invention is particularly advantageous for high-yield, high-speed, continuous production of liquid crystal display panels or organic EL display panels using a combination of optical films which are not able to be continuously laminated in the form of long strips.

The other invention is directed to a system for continuously manufacturing an optical display panel including an optical cell, and a first optical film and a second optical film which are placed in this order on one side of the optical cell, the system includes:

a series of feed units for feeding the optical cell and the optical display panel;

a first optical film supply unit for supplying a first optical film from a first optical film roll, wherein the first optical film is obtained by transversely cutting a first long optical film;

a first bonding unit for bonding the first optical film to one side of the optical cell while feeding the optical cell fed by the feed units, wherein the first optical film is supplied by the first optical film supply unit, and bonding the first optical film is started from one of a pair of opposite sides of the optical cell and performed along a direction in which the first optical film is supplied;

a second optical film supply unit for supplying a second optical film from a second optical film roll, wherein the second optical film is obtained by transversely cutting a second long optical film; and a second bonding unit for bonding the second optical film onto the first optical film bonded to the one side of the optical cell, while feeding the optical cell fed by the feed units, wherein the second optical film is supplied by the second optical film supply unit, and bonding the second optical film is started from one of another pair of opposite sides of the optical cell and performed along a direction in which the second optical film is supplied.

According to this feature, the first and second optical films, which are not able to be continuously laminated in the form of long strips, are each continuously supplied from a roll, each bonded to the optical cell along the original direction in which each film is supplied from each roll, and bonded, in directions relatively perpendicular to each other, to the optical cell, so that they can be continuously laminated to one side of the optical cell at high speed and high yield. This makes possible high-yield, high-speed, continuous production of optical display panels in which the first and second optical films are laminated in a proper arrangement relationship to one side of the optical cell.

In an embodiment of the invention, the feed units further includes an orientation changing unit for interchanging the direction of a pair of opposite sides of the optical cell and the direction of another pair of opposite sides of the optical cell relative to a direction in which the optical cell is fed, wherein the orientation changing unit is provided between the first bonding unit and the second bonding unit.

According to this feature, the first optical film and the second optical film can be bonded, in directions relatively perpendicular to each other, to the optical cell without arranging the long first optical film feed line and the second long optical film feed line perpendicular to each other, so that the space required for the apparatus can be reduced.

In an embodiment of the invention, the first optical film supply unit and the second optical film supply unit are so arranged as to supply the first optical film and the second optical film in directions parallel to each other.

According to this feature, the lines for feeding the first optical film and the second optical film are arranged parallel to each other, so that the space occupied by the apparatus can be reduced. Examples of the configuration in which the lines for feeding the first optical film and the second optical film are arranged parallel to each other include not only a configuration in which these feed lines are arranged in a straight line but also a configuration in which these feed lines are not arranged in a straight line but arranged parallel to each other.

In an embodiment of the invention, the first long optical film is a long retardation film including a laminate of a long λ/4 retardation film having a slow axis in its longitudinal direction and a long λ/2 retardation film having a slow axis in a direction making an angle of 67.5 degrees with its longitudinal direction, and the second long optical film is a long polarizing film having an absorption axis in its longitudinal direction.

This feature makes possible high-yield, high-speed, continuous production of optical display panels each having a circularly polarizing film composed of a λ/4 retardation film, a λ/2 retardation film, and a polarizing film, which are laminated in this order in a proper arrangement relationship.

In an embodiment of the invention, the system further includes:

a fourth optical film supply unit for supplying a fourth optical film from a fourth optical film roll, wherein the fourth optical film is obtained by transversely cutting a long fourth optical film; and a fourth bonding unit for bonding the fourth optical film onto the second optical film bonded to the one side of the optical cell, while feeding the optical cell fed by the feed units, wherein the fourth optical film is supplied by the fourth optical film supply unit, and bonding the fourth optical film is started from one of a pair of opposite sides of the optical cell and performed along a direction in which the fourth optical film is supplied.

According to this feature, the second and fourth optical films, which are not able to be continuously laminated in the form of long strips, are each continuously supplied from a roll, each bonded to the optical cell along the original direction in which each film is supplied from each roll, and bonded, in directions relatively perpendicular to each other, to the optical cell, so that they can be continuously laminated to one side of the optical cell at high speed and high yield. This makes possible high-yield, high-speed, continuous production of optical display panels in which the first, second, and fourth optical films are laminated in a proper arrangement relationship to one side of the optical cell.

In an embodiment of the invention, the feed units further includes an orientation changing unit for interchanging the direction of a pair of opposite sides of the optical cell and the direction of another pair of opposite sides of the optical cell relative to a direction in which the optical cell is fed, wherein the orientation changing unit is provided between the second bonding unit and the fourth bonding unit.

According to this feature, the second optical film and the fourth optical film can be bonded, in directions relatively perpendicular to each other, to the optical cell without arranging the second long optical film feed line and the long fourth optical film feed line perpendicular to each other, so that the space required for the apparatus can be reduced.

In an embodiment of the invention, the first optical film supply unit, the second optical film supply unit, and the fourth optical film supply unit are so arranged as to supply the first optical film, the second optical film, and the fourth optical film in directions parallel to one another.

According to this feature, the lines for feeding the first optical film, the second optical film, and the fourth optical film are arranged parallel to one another, so that the space occupied by the apparatus can be reduced. Examples of the configuration in which the lines for feeding the first optical film, the second optical film, and the fourth optical film are arranged parallel to one another include not only a configuration in which these feed lines are arranged in a straight line but also a configuration in which these feed lines are not arranged in a straight line but arranged parallel to one another. Preferably, at least two of these three feed lines are arranged in a straight line.

In an embodiment of the invention, the first long optical film is a long λ/4 retardation film having a slow axis in its transverse direction, the second long optical film is a long λ/2 retardation film having a slow axis in a direction making an angle of 67.5 degrees with its longitudinal direction, and the long fourth optical film is a long polarizing film having an absorption axis in its longitudinal direction.

This feature makes possible high-yield, high-speed, continuous production of optical display panels each having a circularly polarizing film composed of a λ/4 retardation film, a λ/2 retardation film, and a polarizing film, which are laminated in this order in a proper arrangement relationship.

In an embodiment of the invention, the optical cell is a liquid crystal cell or an organic electroluminescent cell.

The invention is particularly advantageous for high-yield, high-speed, continuous production of liquid crystal display panels or organic EL display panels using a combination of optical films which are not able to be continuously laminated in the form of long strips.

In the invention, bonding the first optical film to the optical cell is started from one of a pair of opposite sides of the optical cell. Thus, the first long optical film generally has a width corresponding to a pair of opposite sides of the optical cell. Bonding the second optical film to the optical cell is started from one of another pair of opposite sides of the optical cell. Thus, the second long optical film generally has a width corresponding to another pair of opposite sides of the optical cell. Bonding the fourth optical film to the optical cell is started from one of a pair of opposite sides of the optical cell. Thus, the long fourth optical film generally has a width corresponding to a pair of opposite sides of the optical cell.

The optical cell may have any shape such as a square or a rectangle as long as it is shaped to have a pair of opposite sides and another pair of opposite sides. In general, a pair of opposite sides of the optical cell is perpendicular to another pair of opposite sides of the optical cell.

The optical display panel and the optical cell each generally have a horizontally-long rectangular shape, but alternatively may each have a vertically-long rectangular shape.

In the present context, examples of the method of supplying an optical film from an optical film roll include (1) a method including feeding a long multilayer optical film from an optical film roll, wherein the long multilayer optical film includes a carrier film and a long optical film placed thereon, transversely cutting the long optical film, and supplying the resulting cut piece of the optical film; and (2) a method of supplying an optical film by feeding, from an optical film roll (scored optical film roll), a long multilayer optical film including a carrier film and a long optical film placed thereon and having a plurality of score lines each formed in the transverse direction. Any of these methods may be used.

BRIEF DESCRIPTION OF THE DRAWINGS

FIG. 2A is a diagram showing a first bonding unit in Embodiment 1;

FIG. 3C is a flow chart illustrating the sequence of placing first, second, and third optical films on an optical cell;

FIG. 3E is a flow chart illustrating the sequence of placing first, second, and third optical films on an optical cell;

FIG. 3F is a flow chart illustrating the sequence of placing first, second, and third optical films on an optical cell;

FIG. 6 is a schematic diagram of the system of Embodiment 3 for continuously manufacturing an optical display panel;

FIG. 7C is a diagram showing a third bonding unit in Embodiment 3; and

MODE FOR CARRYING OUT THE INVENTION

Embodiment 1

Figure 1:
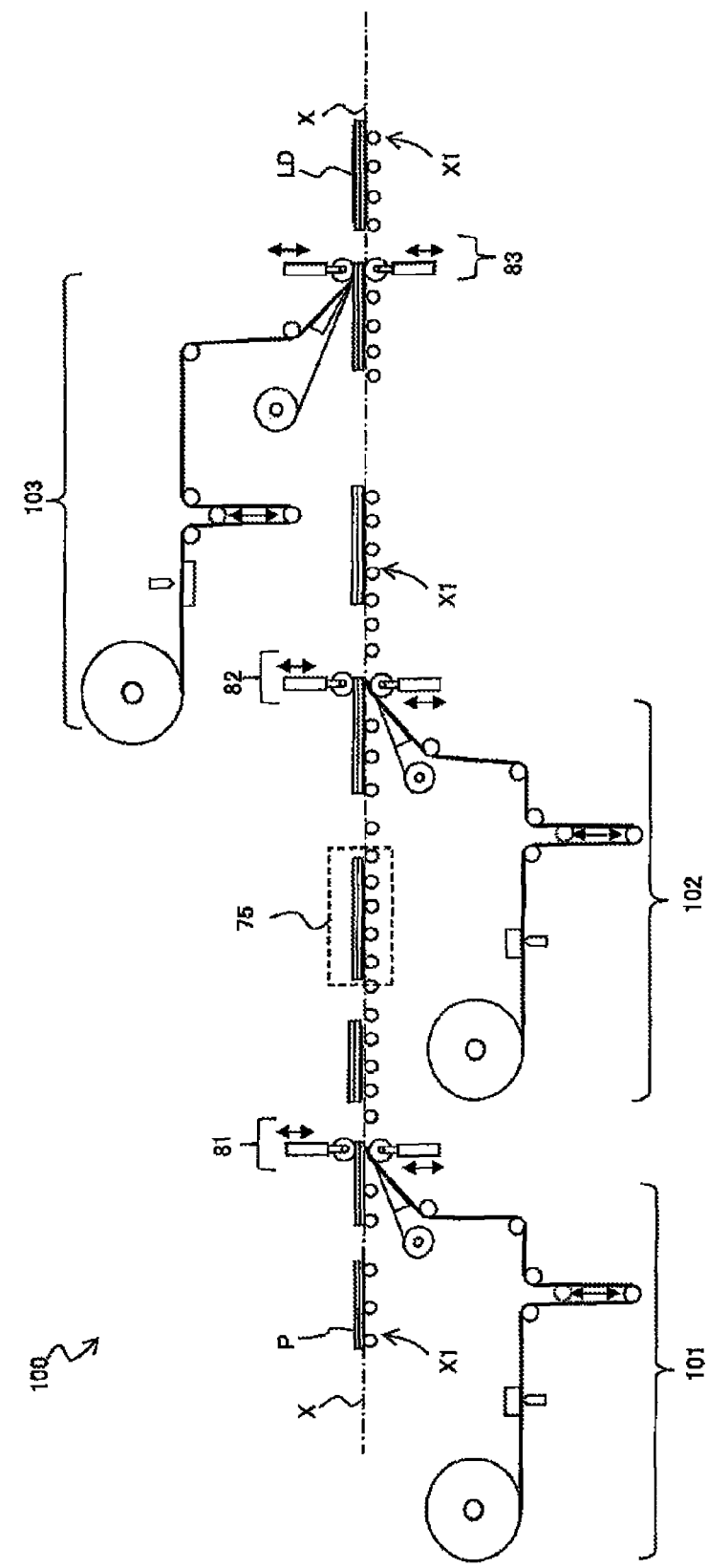
FIG. 1 is a schematic diagram of the system of Embodiment 1 for continuously manufacturing an optical display panel.

FIGS. 1 and 2A to 2C are schematic diagrams of the system of Embodiment 1 for continuously manufacturing an optical display panel. Hereinafter, the system of this embodiment for continuously manufacturing an optical display panel will be specifically described with reference to FIGS. 1 and 2A to 2C.

This embodiment will also be described with reference to an example where the optical cell is a horizontally-long rectangular liquid crystal cell and the optical display panel is a horizontally-long rectangular liquid crystal display panel. The optical film rolls used are as shown in FIGS. 1 and 2A to 2C. Specifically, the first optical film roll 1 used is a roll of a first long multilayer optical film 10 having a width corresponding to the long side of a liquid crystal cell P. The first long multilayer optical film 10 includes a first carrier film 12 and a first long polarizing film 11 (corresponding to the first optical film) placed on the first carrier film 12 and having an absorption axis in the longitudinal direction. The second optical film roll 2 used is a roll of a second long multilayer optical film 20 having a width corresponding to the short side of the liquid crystal cell P. The second long multilayer optical film 20 includes a second carrier film 22 and a long linearly polarized light separating film 21 (corresponding to the second optical film) placed on the second carrier film 22 and having a reflection axis in the transverse direction. The third optical film roll 3 used is a roll of a third long multilayer optical film 30 having a width corresponding to the short side of the liquid crystal cell P. The third long multilayer optical film 30 includes a third carrier film 32 and a second long polarizing film 31 (corresponding to the third optical film) placed on the third carrier film 32 and having an absorption axis in the longitudinal direction. In this embodiment, as shown in FIG. 2A, the first long polarizing film 11 includes a long main film part 11*a* and a pressure-sensitive adhesive 11*b*. As shown in FIG. 2B, the long linearly polarized light separating film 21 includes a long main film part 21*a* and a pressure-sensitive adhesive 21*b*. As shown in FIG. 2C, the second long polarizing film 31 includes a long main film part 31*a* and a pressure-sensitive adhesive 31*b*.

Figure 2B:
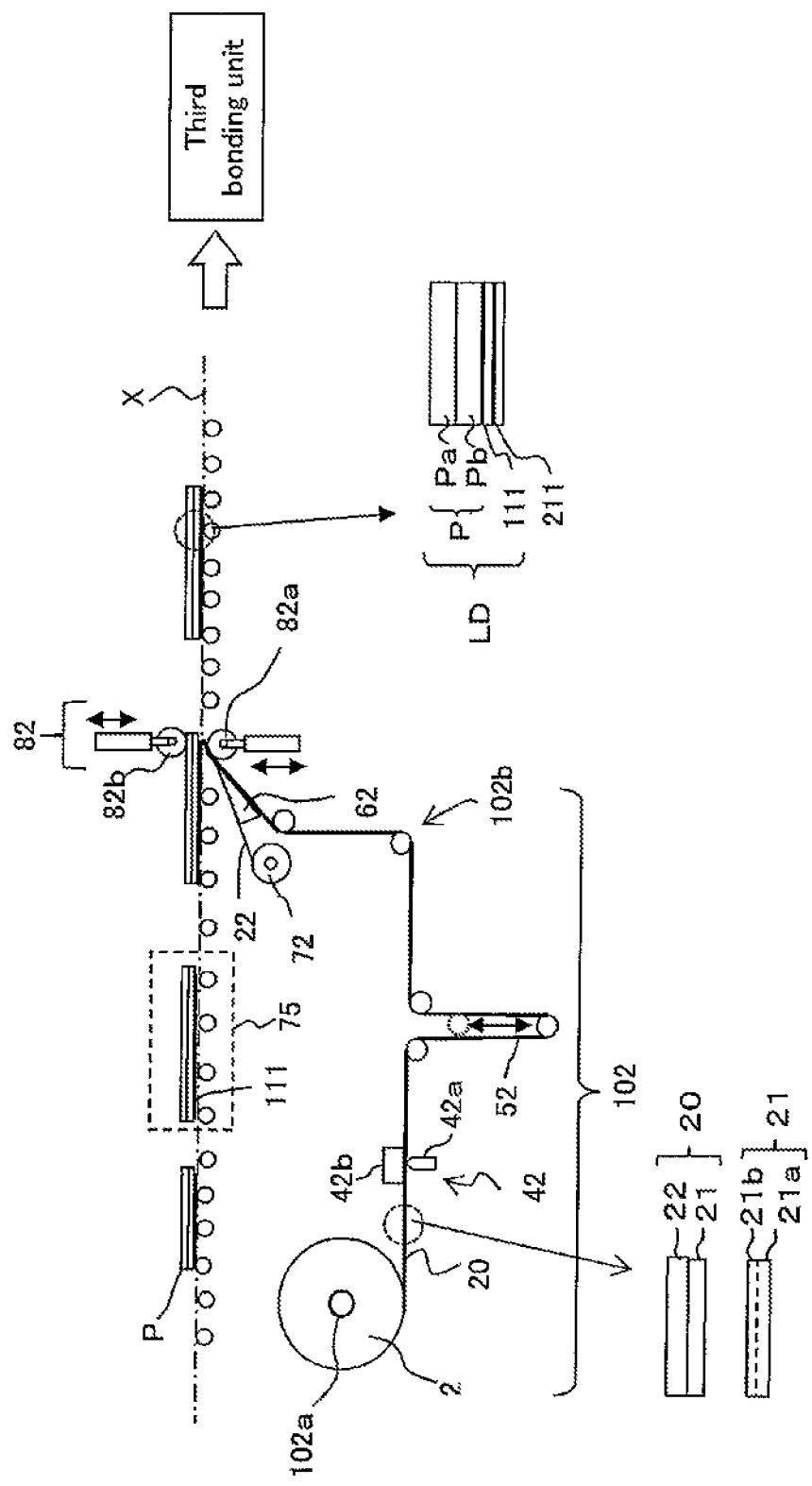
FIG. 2B is a diagram showing a second bonding unit in Embodiment 1.
Figure 2C:
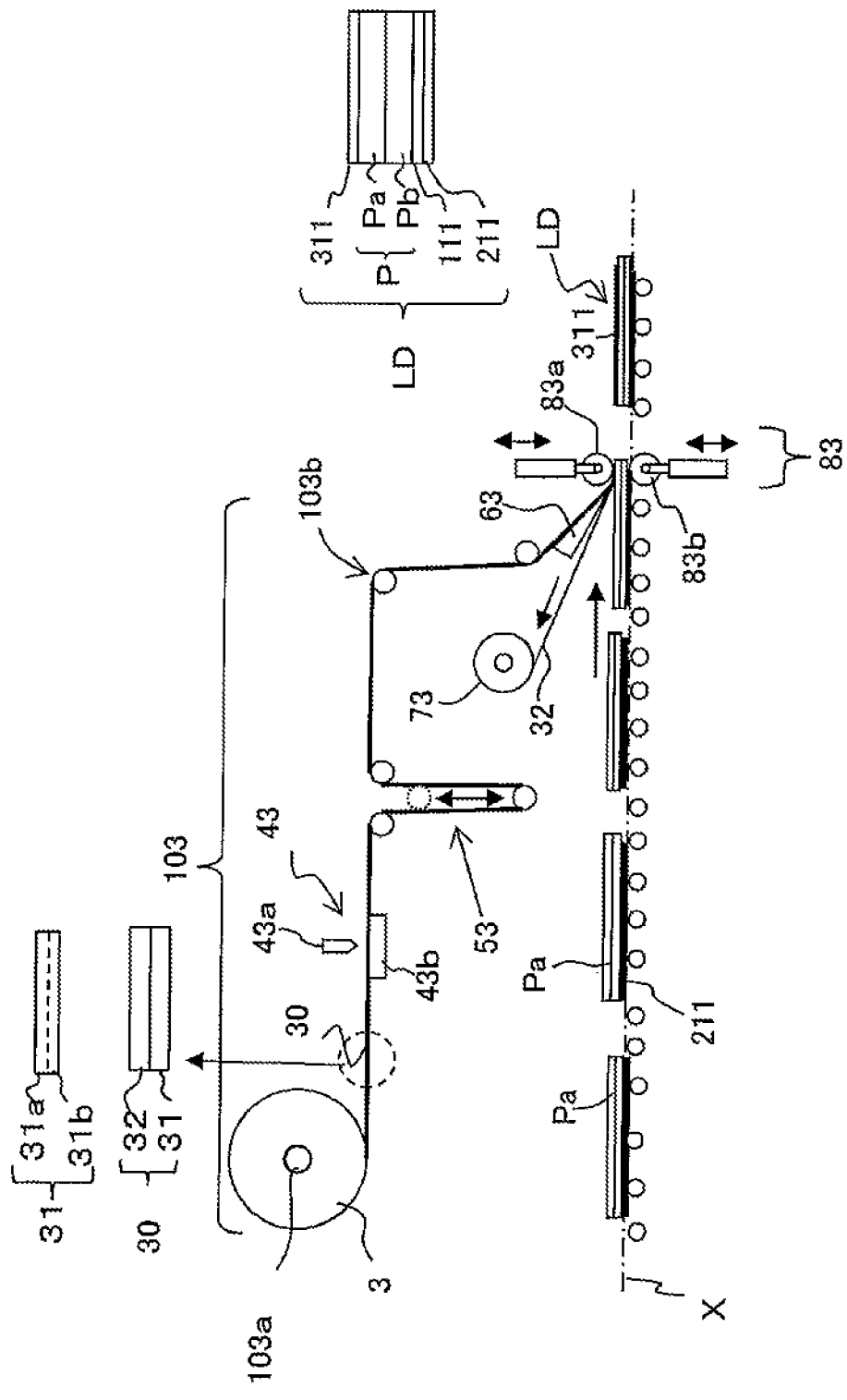
FIG. 2C is a diagram showing a third bonding unit in Embodiment 1.

As shown in FIG. 1, the system 100 of this embodiment for continuously manufacturing a liquid crystal display panel includes a series of feed units X for feeding a liquid crystal cell P and a liquid crystal display panel LD, a first optical film supply unit 101, a first bonding unit 81, a second optical film supply unit 102, a second bonding unit 82, a third optical film supply unit 103, and a third bonding unit 83.

(Feed Units)

The feed units X are configured to feed the liquid crystal cell P and the liquid crystal display panel LD. The feed units X include a plurality of feed rollers X1, a suction plate, and other components. Although described in detail later, the feed units X in this embodiment also include an orientation changing unit 75 provided between the first bonding unit 81 and the second bonding unit 82 for interchanging the directions of the long and short sides of the liquid crystal cell P relative to the direction in which the liquid crystal cell P is fed.

(First Optical Film Supply Unit)

The first optical film supply unit 101 is configured to perform a process including unwinding the first long multilayer optical film 10, which has a width corresponding to the long side of the liquid crystal cell P, from the first optical film roll 1, cutting the first long polarizing film 11 in the transverse direction at intervals corresponding to the short side of the liquid crystal cell P to form a first polarizing film 111; and supplying the resulting first polarizing film 111 to the first bonding unit 81. In this embodiment, the first optical film supply unit 101 includes a first unwinding unit 101*a*, a first cutting unit 41, a first tension control unit 51, a first peeling unit 61, a first take-up unit 71, and a plurality of feed roller units.

The first unwinding unit 101*a* has an unwinding shaft, on which the first optical film roll 1 is mounted, and is configured to unwind the first long multilayer optical film 10 from the first optical film roll 1. The first unwinding unit 101*a* may have two unwinding shafts. This makes it possible to rapidly join a film to another film from a roll mounted on another unwinding shaft without replacing the roll 1 with new one.

The first cutting unit 41 includes cutting means 41*a* and suction means 41*b* and is configured to half cut the first long multilayer optical film 10 in the transverse direction at intervals corresponding to the short side of the liquid crystal cell P (namely, to cut the first long polarizing film 11 in the transverse direction without cutting the first carrier film 12). In this embodiment, the first cutting unit 41 is configured to perform a process including cutting the first long polarizing film 11 (the main film part 11*a* and the pressure-sensitive adhesive 11*b*) in the transverse direction using the cutting means 41*a* while fixing the first long multilayer optical film 10 by sucking it from the first carrier film 12 side with the suction means 41*b*, so that a first polarizing film 111 of a size corresponding to that of the liquid crystal cell P is formed on the first carrier film 12. The cutting means 41*a* may be a cutter, a laser, or a combination thereof.

The first tension control unit 51 has the function of maintaining a tension on the first long multilayer optical film 10. In this embodiment, a non-limiting example of the first tension control unit 51 includes dancer rolls.

The first peeling unit 61 is configured to peel off the first polarizing film 111 from the first carrier film 12 by folding back the first long multilayer optical film 10 with the first carrier film 12 inside. The first peeling unit 61 may include a wedge-shaped member, rollers, and other components.

The first take-up unit 71 is configured to take up the first carrier film 12 from which the first polarizing film 111 is peeled off. The first take-up unit 71 has a take-up shaft on which a roll for taking up the first carrier film 12 is mounted.

(First Bonding Unit)

The first bonding unit 81 is configured to perform a process including bonding the first polarizing film 111 (peeled off by the first peeling unit 61) to the back side Pb of the liquid crystal cell P with the pressure-sensitive adhesive 11*b* interposed therebetween while feeding the liquid crystal cell P in a direction parallel to the short side of the liquid crystal cell P, which is fed by the feed units X, wherein the first polarizing film 111 is supplied by the first optical film supply unit 101, and bonding the first polarizing film 111 is started from the long side of the liquid crystal cell P and performed along the direction in which the first polarizing film 111 is supplied (or along the direction of the short side of the liquid crystal cell P). The first bonding unit 81 includes a pair of bonding rollers 81*a* and 81*b*, in which at least one of the bonding rollers 81*a* and 81*b* is a driving roller.

(Second Optical Film Supply Unit)

The second optical film supply unit 102 is configured to perform a process including unwinding the second long multilayer optical film 20, which has a width corresponding to the short side of the liquid crystal cell P, from the second optical film roll 2, cutting the long linearly polarized light separating film 21 in the transverse direction at intervals corresponding to the long side of the liquid crystal cell P to form a linearly polarized light separating film 211; and supplying the resulting linearly polarized light separating film 211 to the second bonding unit 82. In this embodiment, the second optical film supply unit 102 includes a second unwinding unit 102*a*, a second cutting unit 42, a second tension control unit 52, a second peeling unit 62, a second take-up unit 72, and a plurality of feed roller units. The second unwinding unit 102*a*, the second cutting unit 42, the second tension control unit 52, the second peeling unit 62, and the second take-up unit 72 have the same configuration and function as the first unwinding unit 101*a*, the first cutting unit 41, the first tension control unit 51, the first peeling unit 61, and the first take-up unit 71, respectively.

(Second Bonding Unit)

The second bonding unit 82 is configured to perform a process including bonding the linearly polarized light separating film 211 (peeled off by the second peeling unit 62) to the first polarizing film 111 on the back side Pb of the liquid crystal cell P with the pressure-sensitive adhesive 21b interposed therebetween while feeding the liquid crystal cell P in a direction parallel to the long side of the liquid crystal cell P, which is fed by the feed units X, wherein the linearly polarized light separating film 211 is supplied by the second optical film supply unit 102, and bonding the linearly polarized light separating film 211 is started from the short side of the liquid crystal cell P and performed along the direction in which the linearly polarized light separating film 211 is supplied (or along the direction of the long side of the liquid crystal cell P). The second bonding unit 82 includes a pair of bonding rollers 82a and 82b, in which at least one of the bonding rollers 82a and 82b is a driving roller.

(Third Optical Film Supply Unit)

The third optical film supply unit 103 is configured to perform a process including unwinding the third long multilayer optical film 30, which has a width corresponding to the short side of the liquid crystal cell P, from the third optical film roll 3, cutting the second long polarizing film 31 in the transverse direction at intervals corresponding to the long side of the liquid crystal cell P to form a second polarizing film 311; and supplying the resulting second polarizing film 311 to the third bonding unit 83. In this embodiment, the third optical film supply unit 103 includes a third unwinding unit 103a, a third cutting unit 43, a third tension control unit 53, a third peeling unit 63, a third take-up unit 73, and a plurality of feed roller units. The third unwinding unit 103a, the third cutting unit 43, the third tension control unit 53, the third peeling unit 63, and the third take-up unit 73 have the same configuration and function as the first unwinding unit 101a, the first cutting unit 41, the first tension control unit 51, the first peeling unit 61, and the first take-up unit 71, respectively.

(Third Bonding Unit)

The third bonding unit 83 is configured to perform a process including bonding the second polarizing film 311 (peeled off by the third peeling unit 63) to the viewer side Pa of the liquid crystal cell P with the pressure-sensitive adhesive 31b interposed therebetween while feeding the liquid crystal cell P in a direction parallel to the long side of the liquid crystal cell P, which is fed by the feed units X, wherein the second polarizing film 311 is supplied by the third optical film supply unit 103, and bonding the second polarizing film 311 is started from the short side of the liquid crystal cell P and performed along the direction in which the second polarizing film 311 is supplied (or along the direction of the long side of the liquid crystal cell P). The third bonding unit 83 includes a pair of bonding rollers 83a and 83b, in which at least one of the bonding rollers 83a and 83b is a driving roller.

(Orientation Changing Unit)

In this embodiment, the feed units X include an orientation changing unit 75 provided between the first bonding unit 81 and the second bonding unit 82. The orientation changing unit 75 is configured to interchange the directions of the long and short sides of the liquid crystal cell P, to which the first polarizing film 111 has been bonded, relative to the direction in which the liquid crystal cell P is fed. In this embodiment, the orientation changing unit 75 includes a rotation unit for horizontally rotating the liquid crystal cell P by 90° while sucking it; and a turnover unit for turning the liquid crystal cell P upside down by sucking the liquid crystal cell P and rotating it about an in-cell-plane rotation axis parallel or perpendicular to the direction in which the liquid crystal cell P is fed. When the orientation changing unit 75 is provided, the first long polarizing film 10 and the long linearly polarized light separating film 20 can be bonded, in directions relatively perpendicular to each other, to the optical cell P without arranging the lines for feeding the first long polarizing film 10 and the long linearly polarized light separating film 20 perpendicular to each other, so that the space required for the apparatus can be reduced.

Using the system of this embodiment for continuously manufacturing a liquid display panel, the first polarizing film and the linearly polarized light separating film, which are not able to be continuously laminated in the form of long strips, can be each continuously supplied from the roll, each bonded to the liquid crystal cell along the original direction in which each film is supplied from each roll, and bonded, in directions relatively perpendicular to each other, to the liquid crystal cell, so that they can be continuously laminated to the back side of the liquid crystal cell at high yield and high speed. In addition, the second polarizing film can also be continuously supplied from the roll and bonded to the liquid crystal cell along the original direction in which the film is supplied from the roll, so that it can be continuously bonded the viewer side of the liquid crystal cell at high speed. These make possible high-yield, high-speed, continuous production of liquid crystal display panels with high light use efficiency, each having the first polarizing film and the linearly polarized light separating film laminated in a proper arrangement relationship to the back side of the liquid crystal cell and having the second polarizing film bonded to the viewer side of the liquid crystal cell in such a manner that the crossed-Nicols relationship is established between the first and second polarizing films. In this embodiment, the first optical film supply unit, the second optical film supply unit, and the third optical film supply unit are so arranged as to supply the first polarizing film, the linearly polarized light separating film, and the second polarizing film in directions parallel to one another, so that the space occupied by the apparatus can be reduced.

Modifications of Embodiment 1

In this embodiment, the first, second, and third bonding units are arranged in this order along the direction in which the liquid crystal cell P is fed by the feed units X. However, the first, second, third bonding units may be arranged in any other order as long as the first and second bonding units are arranged in this order. For example, along the direction in which the liquid crystal cell P is fed by the feed units X, the first, third, and second bonding units may be arranged in this order, or the third, first, and second bonding units may be arranged in this order.

In this embodiment, the first, second, and third bonding units are configured to bond the first polarizing film and the linearly polarized light separating film to the lower side of the liquid crystal cell and to bond the second polarizing film to the upper side of the liquid crystal cell. However, this is non-limiting. Alternatively, any two of the films may be bonded to the upper side of the liquid crystal cell, and the remaining one may be bonded to the lower side of the liquid crystal cell, or all the films may be bonded to the upper or lower side of the liquid crystal cell.

In this embodiment, the third optical film supply unit is configured to supply the second polarizing film from the third optical film roll in the same manner as the manner in which the first polarizing film and the linearly polarized light separating film are supplied. However, this is non-limiting. Alternatively, the third optical film supply unit may be configured to take and supply the second polarizing film from a container containing pieces of the second polarizing film. For example, the third optical film supply unit may include a feed unit for taking and feeding the second multilayer optical film from a container containing pieces of the second multilayer optical film and a peeling unit for peeling off the piece of carrier film from the second multilayer optical film being fed by the feed unit, wherein the feed unit is configured to supply the second polarizing film from which the piece of carrier film is peeled off by the peeling unit. This type of third optical film supply unit is advantageous when the second polarizing film is not suitable or able to be bonded to the liquid crystal cell by the RTP method.

FIGS. 3A to 3F show examples of the order of the first, second, and third bonding steps and examples of the direction in which the optical film is bonded in each bonding step. It will be understood that the order, the bonding direction, the optical film type shown in FIGS. 3A to 3F are non-limiting in this embodiment.

Figure 3A:
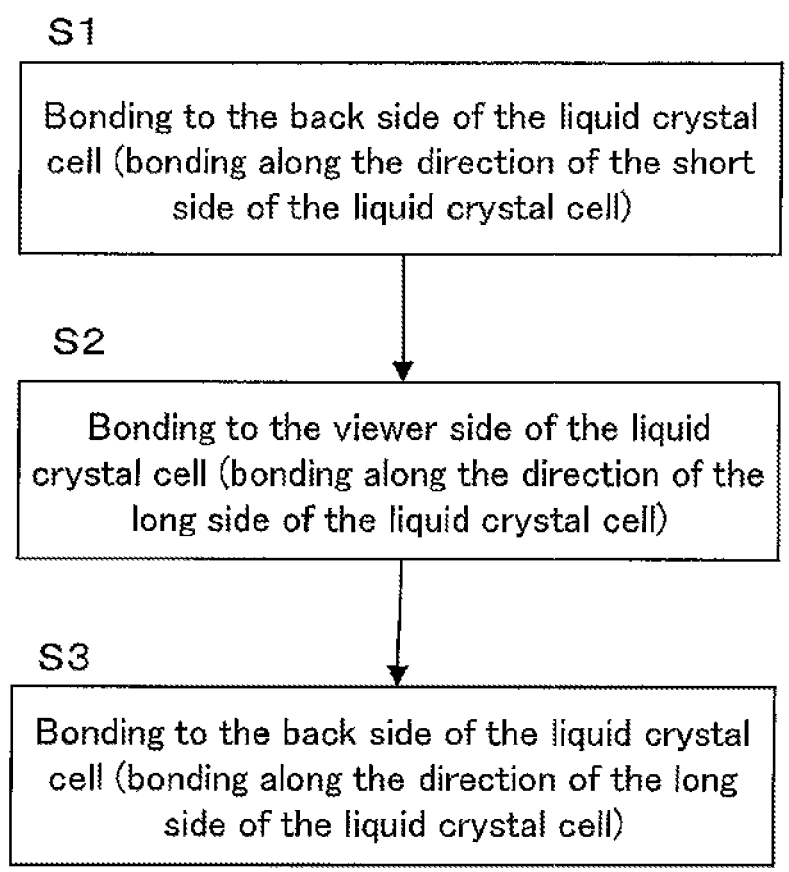
FIG. 3A is a flow chart illustrating the sequence of placing first, second, and third optical films on an optical cell.

FIG. 3A shows a process including bonding the MD polarizing film to the back side of the liquid crystal cell along the direction of the short side of the liquid crystal cell (namely, bonding is started from the long side of the liquid crystal cell) (step S1), then bonding the MD polarizing film to the viewer side of the liquid crystal cell along the direction of the long side of the liquid crystal cell (namely, bonding is started from the short side of the liquid crystal cell) (step S2), and then bonding the linearly polarized light separating film (reflective polarizing film) to the MD polarizing film on the back side of the liquid crystal cell along the direction of the long side of the liquid crystal cell (namely, bonding is started from the short side of the liquid crystal cell) (step S3).

Figure 3B:
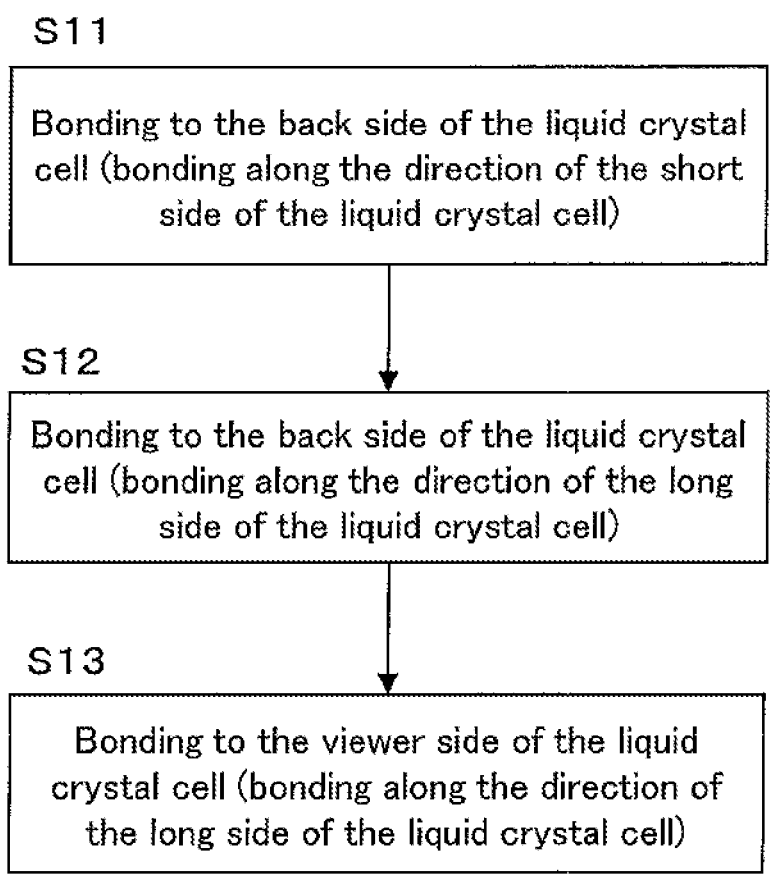
FIG. 3B is a flow chart illustrating the sequence of placing first, second, and third optical films on an optical cell.

FIG. 3B shows a process including bonding the MD polarizing film to the back side of the liquid crystal cell along the direction of the short side of the liquid crystal cell (step S11), then bonding the linearly polarized light separating film (reflective polarizing film) to the MD polarizing film on the back side of the liquid crystal cell along the direction of the long side of the liquid crystal cell (step S12), and then bonding the MD polarizing film to the viewer side of the liquid crystal cell along the direction of the long side of the liquid crystal cell (step S13).

FIG. 3C shows a process including bonding the MD polarizing film to the viewer side of the liquid crystal cell along the direction of the long side of the liquid crystal cell (step S21), then bonding the MD polarizing film to the back side of the liquid crystal cell along the direction of the short side of the liquid crystal cell (step S22), and then bonding the linearly polarized light separating film (reflective polarizing film) to the MD polarizing film on the back side of the liquid crystal cell along the direction of the long side of the liquid crystal cell (step S23).

Figure 3D:
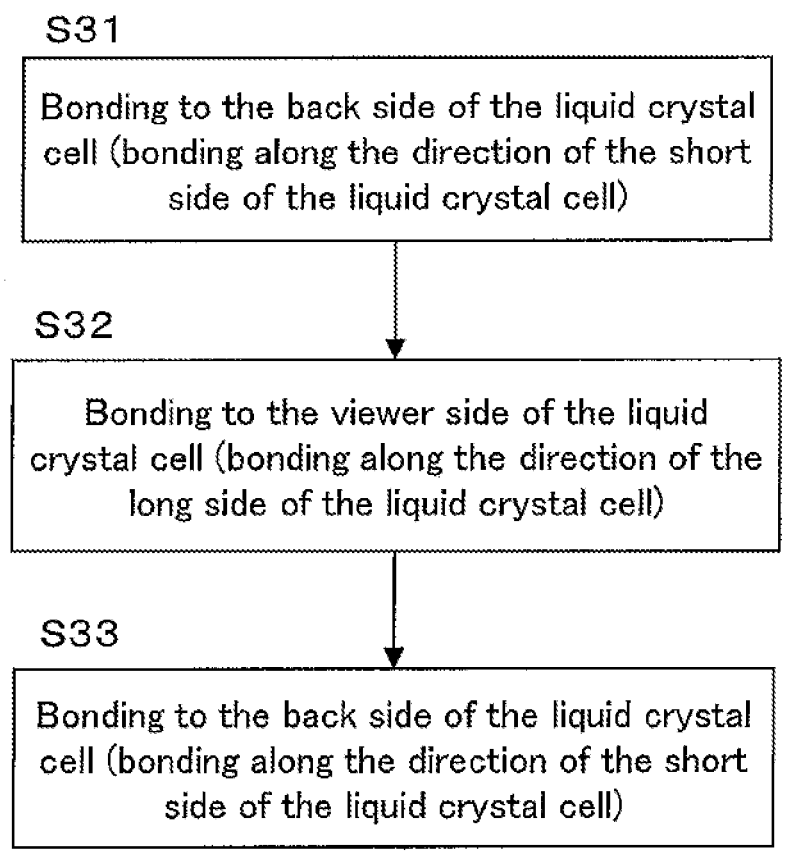
FIG. 3D is a flow chart illustrating the sequence of placing first, second, and third optical films on an optical cell.

FIG. 3D shows a process including bonding a retardation film to the back side of the liquid crystal cell along the direction of the short side of the liquid crystal cell (step S31), then bonding the MD polarizing film to the viewer side of the liquid crystal cell along the direction of the long side of the liquid crystal cell (step S32), and then bonding the MD polarizing film to the retardation film on the back side of the liquid crystal cell along the direction of the short side of the liquid crystal cell (step S33).

FIG. 3E shows a process including bonding the MD polarizing film to the viewer side of the liquid crystal cell along the direction of the long side of the liquid crystal cell (step S41), then bonding a retardation film to the back side of the liquid crystal cell along the direction of the short side of the liquid crystal cell (step S42), and then bonding the MD polarizing film to the retardation film on the back side of the liquid crystal cell along the direction of the short side of the liquid crystal cell (step S43).

FIG. 3F shows a process including bonding a retardation film to the back side of the liquid crystal cell along the direction of the short side of the liquid crystal cell (step S51), then bonding the MD polarizing film to the retardation film on the back side of the liquid crystal cell along the direction of the short side of the liquid crystal cell (step S52), and then bonding the MD polarizing film to the viewer side of the liquid crystal cell along the direction of the long side of the liquid crystal cell (step S53).

As long as the absorption axes of the polarizing films provided on the viewer side and the back side of the liquid crystal cell, respectively, are perpendicular to each other (crossed-Nicols), the viewer side MD polarizing film does not have to be bonded along the direction of the long side of the liquid crystal cell. The viewer side MD polarizing film may be bonded along the direction of the short side, and accordingly, the back side MD polarizing film may be bonded along the direction of the long side of the liquid crystal cell. The MD polarizing film is also non-limiting, and the TD polarizing film may also be used.

Embodiment 2

Figure 4:
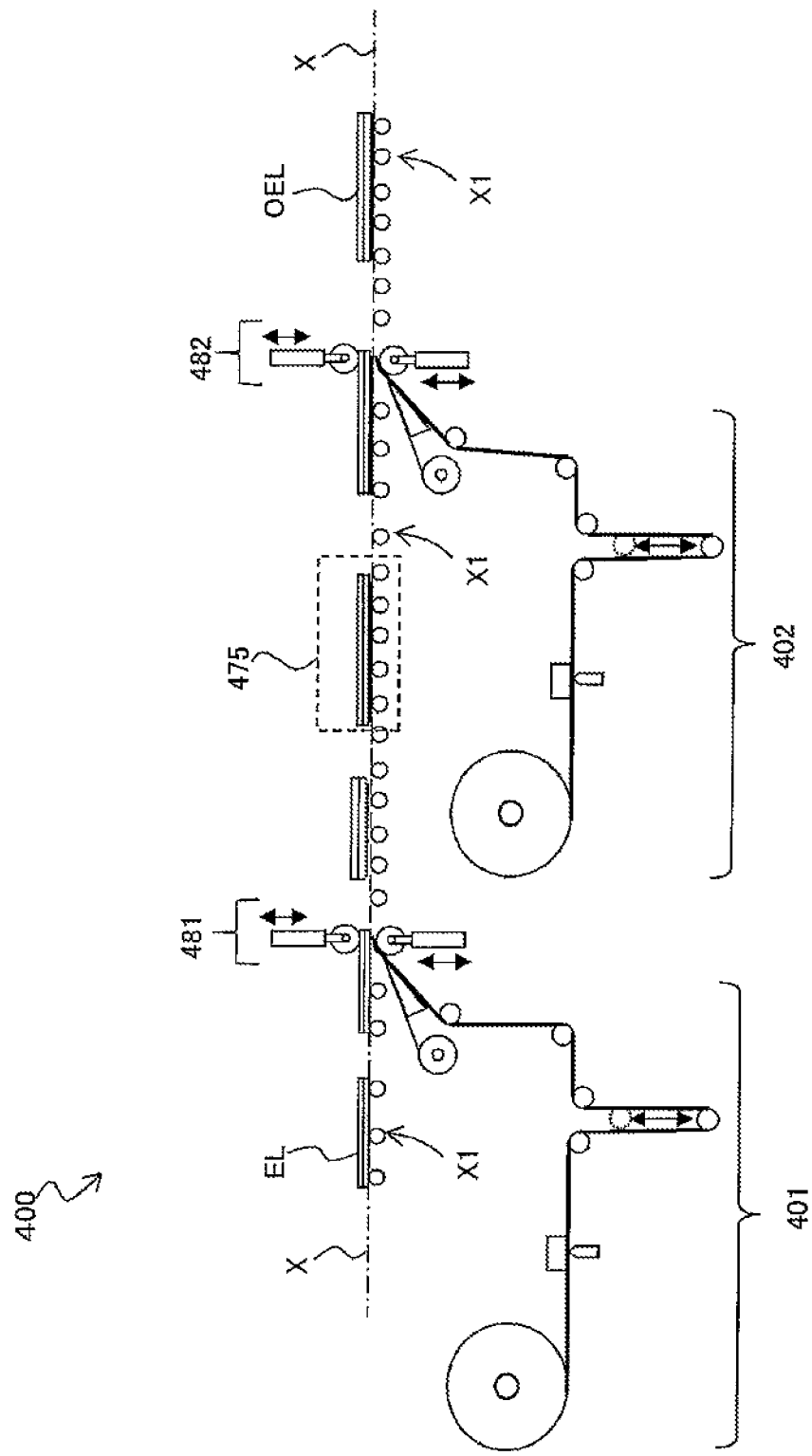
FIG. 4 is a schematic diagram of the system of Embodiment 2 for continuously manufacturing an optical display panel.
Figure 5A:
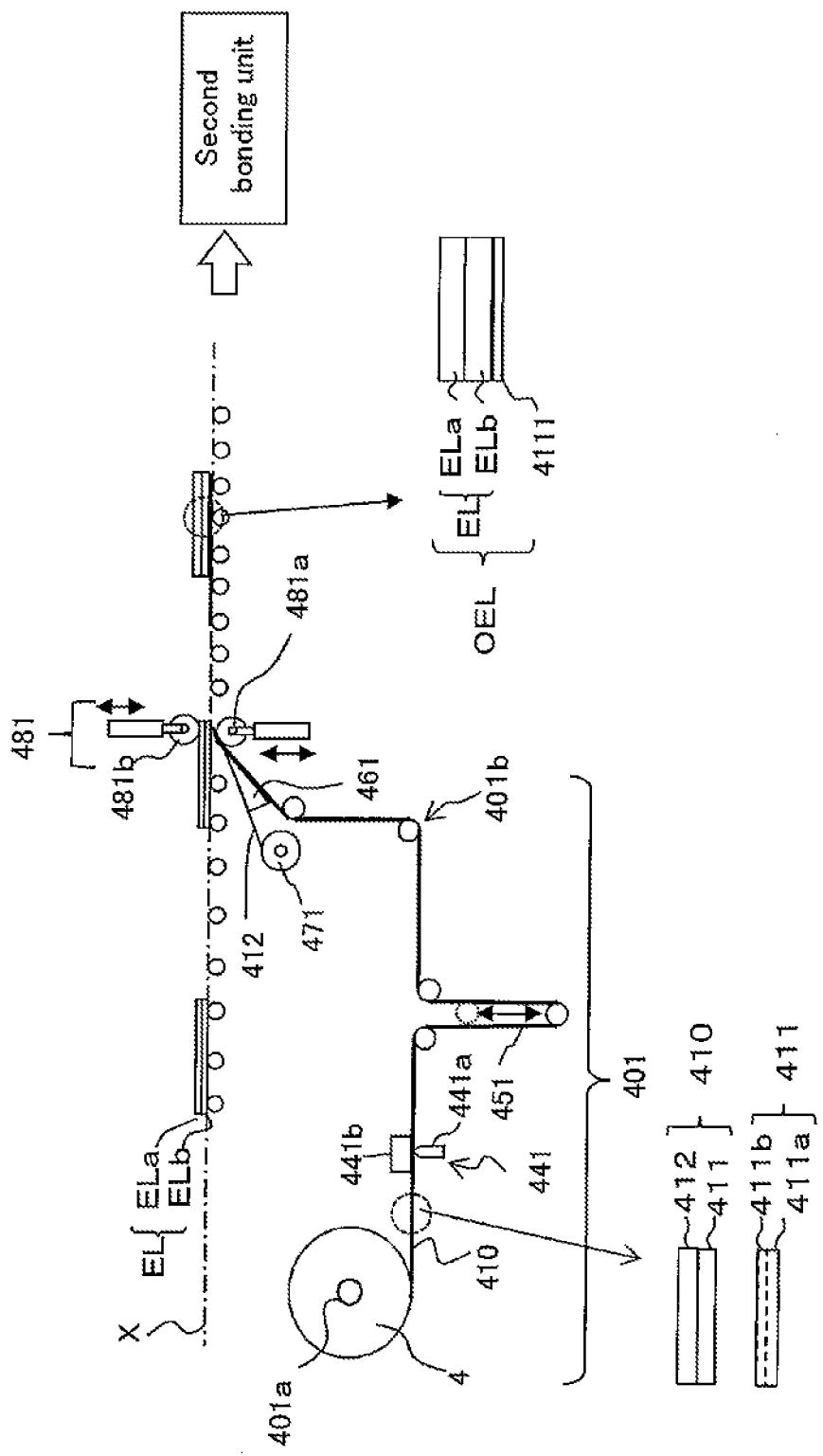
FIG. 5A is a diagram showing a first bonding unit in Embodiment 2.
Figure 5B:
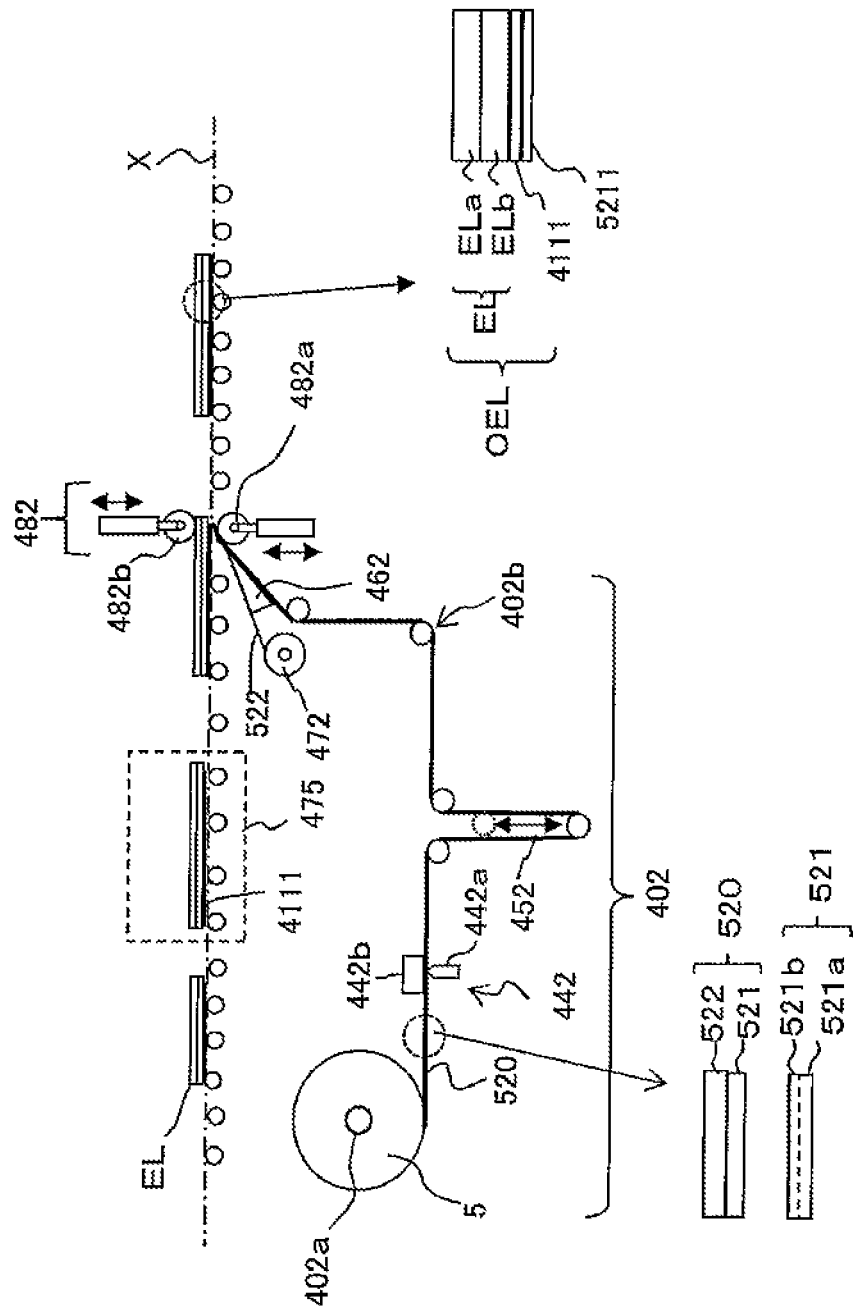
FIG. 5B is a diagram showing a second bonding unit in Embodiment 2.

FIGS. 4 and 5A to 5B are schematic diagrams of the system of Embodiment 2 for continuously manufacturing an organic EL display panel. Hereinafter, the system 400 of this embodiment for continuously manufacturing an organic EL display panel will be specifically described with reference to FIGS. 4 and 5A to 5B.

This embodiment will also be described with reference to an example where the optical cell is a horizontally-long rectangular organic EL cell and the optical display panel is a horizontally-long rectangular organic EL display panel. The optical film rolls to be used are as shown in FIGS. 4 and 5A to 5B. Specifically, the first optical film roll 4 used is a roll of a first long multilayer optical film 410 having a width corresponding to the long side of an organic EL cell EL. The first long multilayer optical film 410 includes a first carrier film 412 and a long retardation film 411 (corresponding to the first optical film) placed on the first carrier film 412 and including a laminate of a long $\lambda/4$ retardation film having a slow axis in the longitudinal direction and a long $\lambda/2$ retardation film having a slow axis in a direction making an angle of 67.5 degrees with the longitudinal direction, which are placed in this order on the carrier film 412. The second optical film roll 5 used is a roll of a second long multilayer optical film 520 having a width corresponding to the short side of the organic EL cell EL. The second long multilayer optical film 520 includes a second carrier film 522 and a long polarizing film 521 (corresponding to the second optical film) placed on the second carrier film 522 and having an absorption axis in the longitudinal direction. In this embodiment, as shown in FIG. 5A, the long retardation film 411 has a long main film part 411a and a pressure-sensitive adhesive 411b. As shown in FIG. 5B, the long polarizing film 521 has a long main film part 521a and a pressure-sensitive adhesive 521b.

As shown in FIG. 4, the system 400 of this embodiment for continuously manufacturing an organic EL display panel includes a series of feed units X for feeding an organic EL cell EL and an organic EL display panel OEL, a first optical film supply unit 401, a first bonding unit 481, a second optical film supply unit 402, and a second bonding unit 482.

(Feed Units)

The feed units X are configured to feed the organic EL cell EL and the organic EL display panel OEL. The feed units X include a plurality of feed rollers X1, a suction plate, and other components. Although described in detail later, the feed units X in this embodiment also include an orientation changing unit 475 provided between the first bonding unit 481 and the second bonding unit 482 for interchanging the directions of the long and short sides of the organic EL cell EL, to which a retardation film 4111 has been bonded, relative to the direction in which the organic EL cell EL is fed.

(First Optical Film Supply Unit)

The first optical film supply unit 401 is configured to perform a process including unwinding the first long multilayer optical film 410, which has a width corresponding to the long side of the organic EL cell EL, from the first optical film roll 4, cutting the long retardation film 411 in the transverse direction at intervals corresponding to the short side of the organic EL cell EL to form a retardation film 4111; and supplying the resulting retardation film 4111 to the first bonding unit 481. In this embodiment, the first optical film supply unit 401 includes a first unwinding unit 401a, a first cutting unit 441, a first tension control unit 451, a first peeling unit 461, a first take-up unit 471, and a plurality of feed roller units.

The first unwinding unit 401a has an unwinding shaft, on which the first optical film roll 4 is mounted, and is configured to unwind the first long multilayer optical film 410 from the first optical film roll 4. The first unwinding unit 401a may have two unwinding shafts. This makes it possible to rapidly join a film to another film from a roll mounted on another unwinding shaft without replacing the roll 4 with new one.

The cutting unit 441 includes cutting means 441a and suction means 441b and is configured to half cut the first long multilayer optical film 410 in the transverse direction at intervals corresponding to the short side of the organic EL cell EL (namely, to cut the long retardation film 411 in the transverse direction without cutting the first carrier film 412). In this embodiment, the first cutting unit 441 is configured to perform a process including cutting the long retardation film 411 (the main film part 411a and the pressure-sensitive adhesive 411b) in the transverse direction using the cutting means 441a while fixing the first long multilayer optical film 410 by sucking it from the first carrier film 412 side with the suction means 441b, so that a retardation film 4111 of a size corresponding to that of the organic EL cell EL is formed on the first carrier film 412. The cutting means 441a may be a cutter, a laser, or a combination thereof.

The first tension control unit 451 has the function of maintaining a tension on the first long multilayer optical film 410. In this embodiment, a non-limiting example of the first tension control unit 451 includes dancer rolls.

The first peeling unit 461 is configured to peel off the retardation film 4111 from the first carrier film 412 by folding back the first long multilayer optical film 410 with the first carrier film 412 inside. The first peeling unit 461 may include a wedge-shaped member, rollers, and other components.

The first take-up unit 471 is configured to take up the first carrier film 412 from which the retardation film 4111 is peeled off. The first take-up unit 471 has a take-up shaft on which a roll for taking up the first carrier film 412 is mounted.

(First Bonding Unit)

The first bonding unit 481 is configured to perform a process including bonding the retardation film 4111 (peeled off by the first peeling unit 461) to the viewer side ELb of the organic EL cell EL with the pressure-sensitive adhesive 411b interposed therebetween while feeding the organic EL cell EL in a direction parallel to the short side of the organic EL cell EL, which is fed by the feed units X, wherein the retardation film 4111 is supplied by the first optical film supply unit 401, and bonding the retardation film 4111 is started from the long side of the organic EL cell EL and performed along the direction in which the retardation film 4111 is supplied (or along the direction of the short side of the organic EL cell EL). The first bonding unit 481 includes a pair of bonding rollers 481a and 481b, in which at least one of the bonding rollers 481a and 481b is a driving roller.

(Second Optical Film Supply Unit)

The second optical film supply unit 402 is configured to perform a process including unwinding the second long multilayer optical film 520, which has a width corresponding to the short side of the organic EL cell EL, from the second optical film roll 5, cutting the long polarizing film 521 in the transverse direction at intervals corresponding to the long side of the organic EL cell EL to form a polarizing film 5211; and supplying the resulting polarizing film 5211 to the second bonding unit 482. In this embodiment, the second optical film supply unit 402 includes a second unwinding unit 402a, a second cutting unit 442, a second tension control unit 452, a second peeling unit 462, a second take-up unit 472, and a plurality of feed roller units. The second unwinding unit 402a, the second cutting unit 442, the second tension control unit 452, the second peeling unit 462, and the second take-up unit 472 have the same configuration and function as the first unwinding unit 401a, the first cutting unit 441, the first tension control unit 451, the first peeling unit 461, and the first take-up unit 471, respectively.

(Second Bonding Unit)

The second bonding unit 482 is configured to perform a process including bonding the polarizing film 5211 (peeled off by the second peeling unit 462) to the retardation film 4111 on the viewer side ELb of the organic EL cell EL with the pressure-sensitive adhesive 521b interposed therebetween while feeding the organic EL cell EL in a direction parallel to the long side of the organic EL cell EL, which is fed by the feed units X, wherein the polarizing film 5211 is supplied by the second optical film supply unit 402, and bonding the polarizing film 5211 is started from the short side of the organic EL cell EL and performed along the direction in which the polarizing film 5211 is supplied (or along the direction of the long side of the organic EL cell EL). The second bonding unit 482 includes a pair of bonding rollers 482a and 482b, in which at least one of the bonding rollers 482a and 482b is a driving roller.

(Orientation Changing Unit)

In this embodiment, the feed units X include an orientation changing unit 475 provided between the first bonding unit 481 and the second bonding unit 482. The orientation changing unit 475 is configured to interchange the directions of the long and short sides of the organic EL cell EL, to which the retardation film 4111 has been bonded, relative to the direction in which the organic EL cell EL is fed. In this embodiment, the orientation changing unit 475 includes a rotation unit for horizontally rotating the organic EL cell EL by 90° while sucking it. When the orientation changing unit 475 is provided, the long retardation film 411 and the long polarizing film 521 can be bonded, in directions relatively perpendicular to each other, to the organic EL cell EL without arranging the lines for feeding the long retardation film 411 and the long polarizing film 521 perpendicular to each other, so that the space required for the apparatus can be reduced.

Using the system of this embodiment for continuously manufacturing an organic EL display panel, the retardation film and the polarizing film, which are not able to be continuously laminated in the form of long strips, can be each continuously supplied from the roll, each bonded to the organic EL cell along the original direction in which each film is supplied from each roll, and bonded, in directions relatively perpendicular to each other, to the organic EL cell, so that they can be continuously laminated to the viewer side of the organic EL cell at high yield and high speed. This makes possible high-yield, high-speed, continuous production of organic EL display panels each having the retardation film and the polarizing film which are laminated in a proper arrangement relationship to form a circularly polarizing film with an anti-reflection function. In this embodiment, the first optical film supply unit and the second optical film supply unit are so arranged as to supply the retardation film and the polarizing film in directions parallel to each other, so that the space occupied by the apparatus can be reduced.

Modifications of Embodiment 2

In this embodiment, the first and second bonding units are configured to bond the retardation film 4111 and the polarizing film 5211 to the lower side of the organic EL cell. However, this is non-limiting. Alternatively, the first and second bonding units may be configured to bond one of the films to the upper side of the organic EL cell, and the remaining one to the lower side of the organic EL cell, or the two films to the upper side of the organic EL cell.

Embodiment 3

FIGS. 6 and 7A to 7C are schematic diagrams of the system of Embodiment 3 for continuously manufacturing an organic EL display panel. Hereinafter, the system 600 of this embodiment for continuously manufacturing an organic EL display panel will be specifically described with reference to FIGS. 6 and 7A to 7C.

Figure 7A:
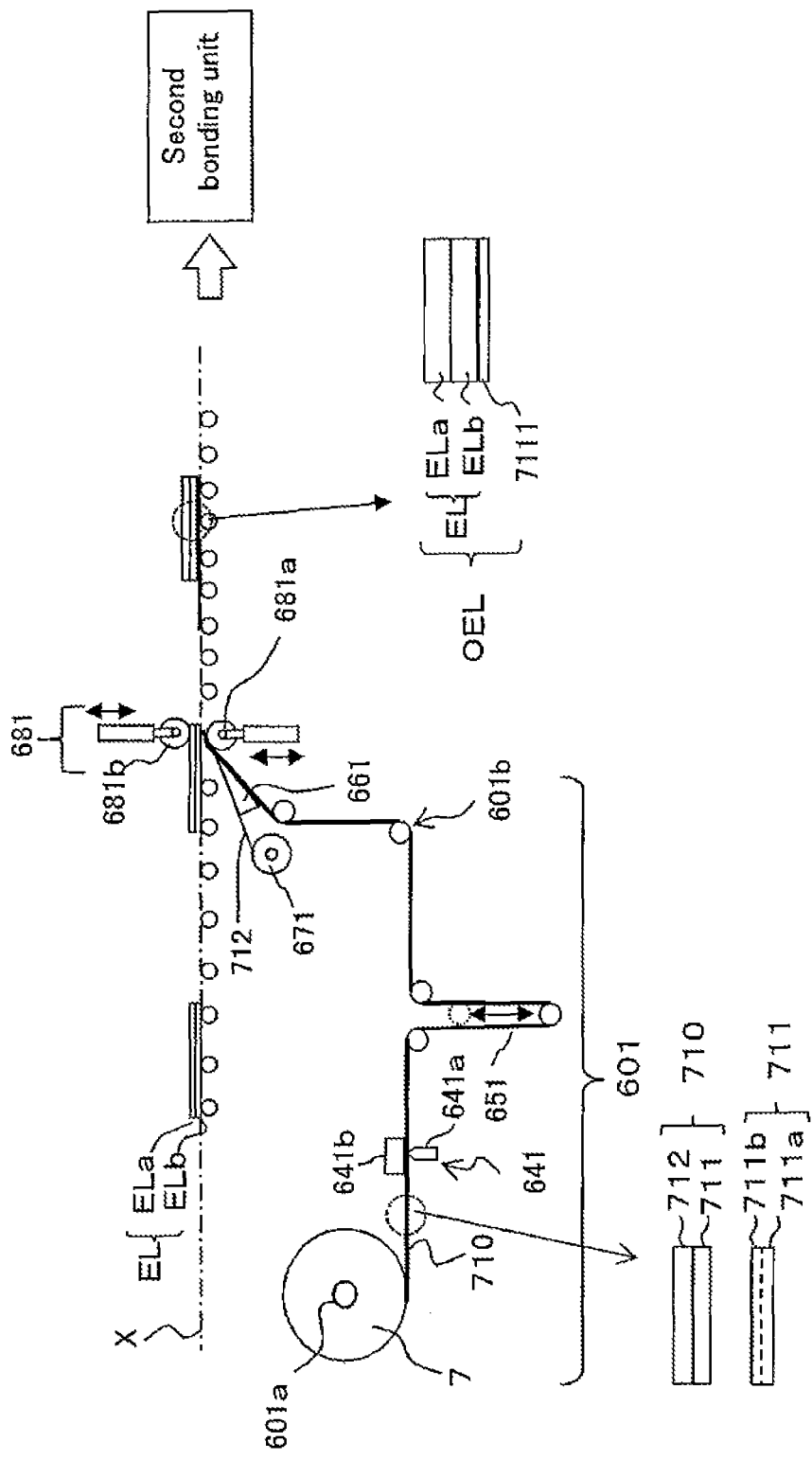
FIG. 7A is a diagram showing a first bonding unit in Embodiment 3.
Figure 7B:
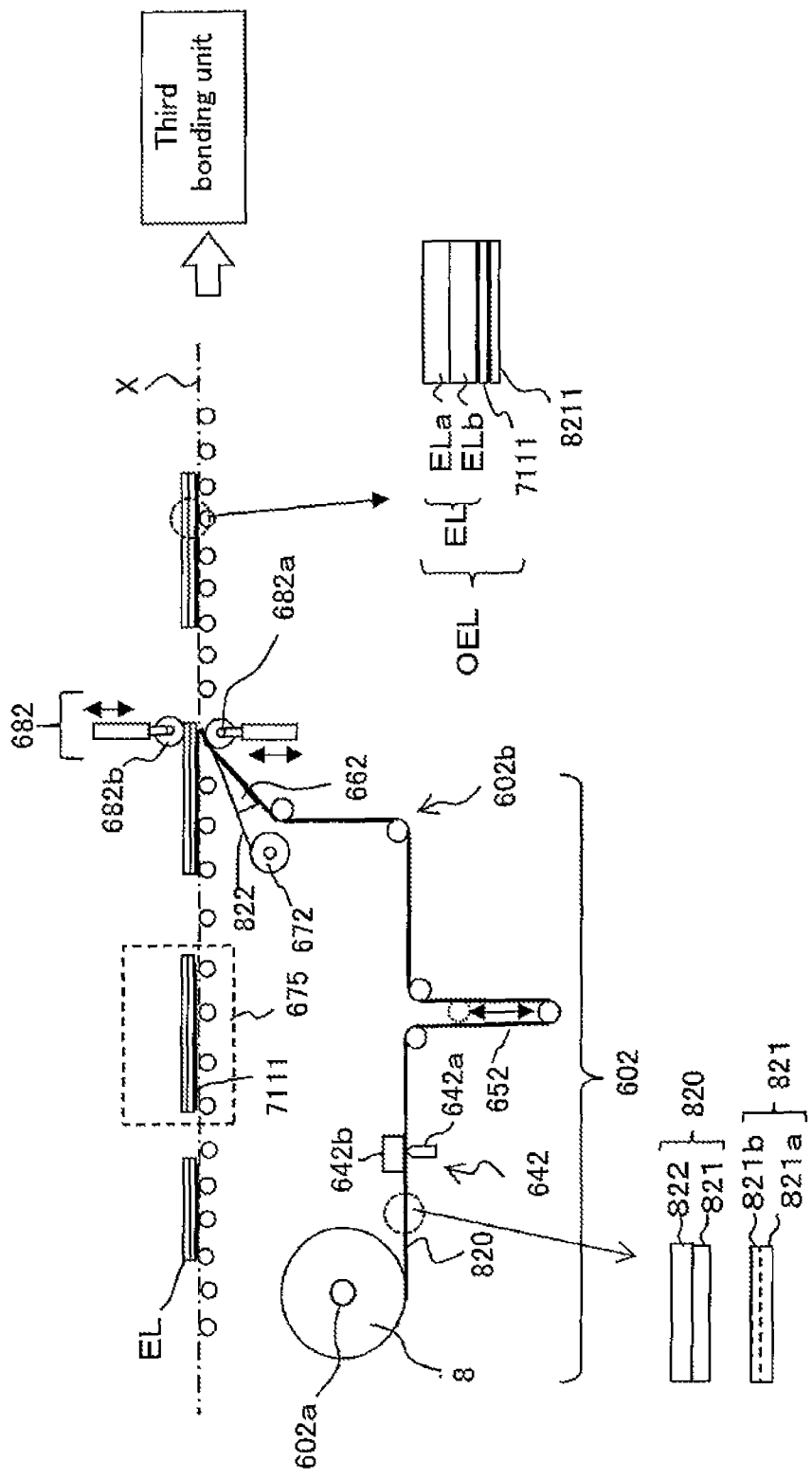
FIG. 7B is a diagram showing a second bonding unit in Embodiment 3.
Figure 8:
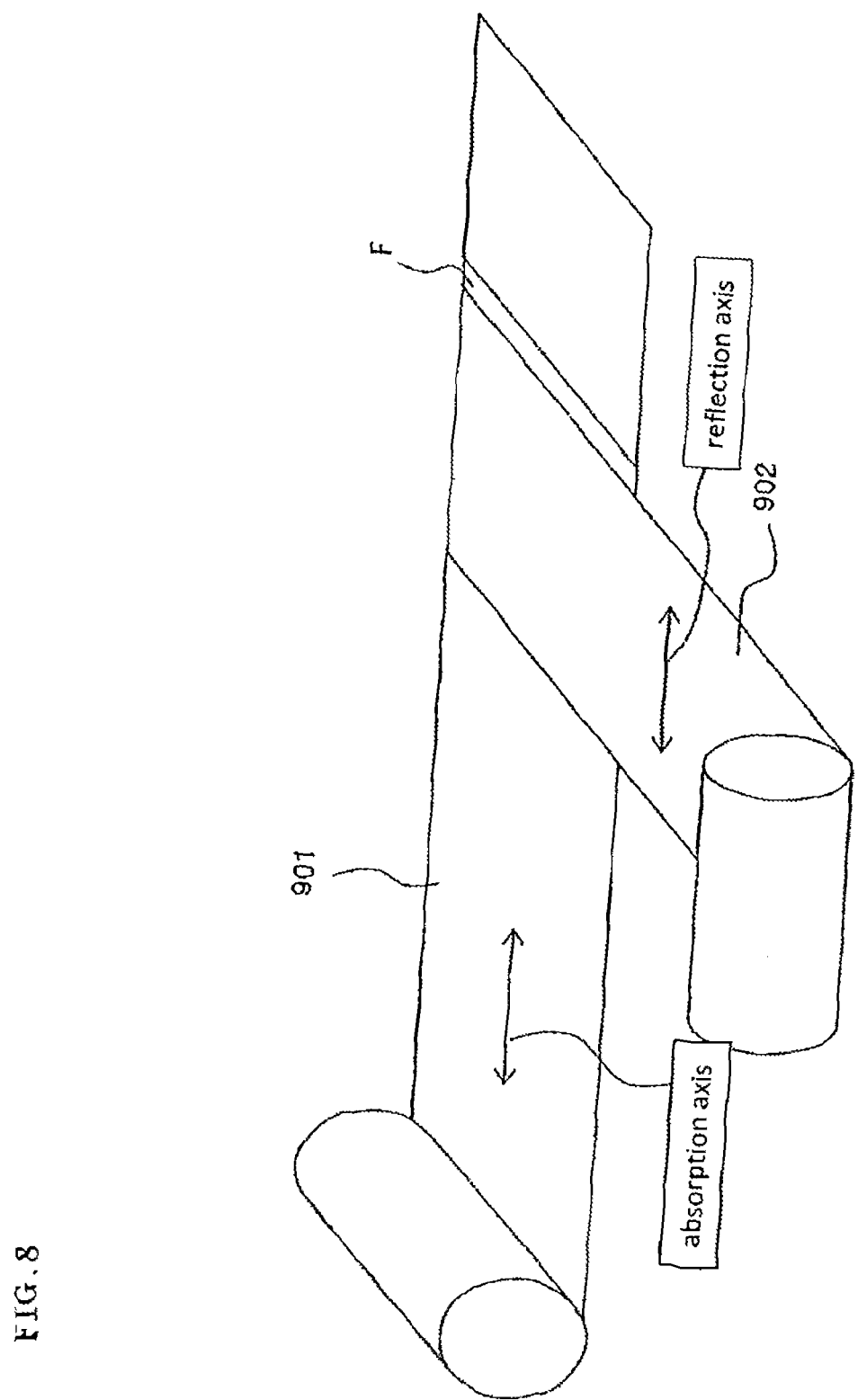
FIG. 8 is a diagram showing a process of placing a linearly polarized light separating film on a long polarizing film.

This embodiment will also be described with reference to an example where the optical cell is a horizontally-long rectangular organic EL cell and the optical display panel is a horizontally-long rectangular organic EL display panel. The optical film rolls to be used are as shown in FIGS. 6 and 7A to 7C. Specifically, the first optical film roll 7 used is a roll of a first long multilayer optical film 710 having a width corresponding to the short side of an organic EL cell EL. The first long multilayer optical film 710 includes a first carrier film 712 and a long λ/4 retardation film 711 (corresponding to the first optical film) placed on the first carrier film 712 and having a slow axis in the transverse direction. The second optical film roll 8 used is a roll of a second long multilayer optical film 820 having a width corresponding to the long side of the organic EL cell EL. The second long multilayer optical film 820 includes a second carrier film 822 and a long λ/2 retardation film 821 (corresponding to the second optical film) placed on the second carrier film 822 and having a slow axis in a direction making an angle of 67.5 degrees with the longitudinal direction. The fourth optical film roll 9 used is a roll of a fourth long multilayer optical film 930 having a width corresponding to the short side of the organic EL cell EL. The fourth long multilayer optical film 930 includes a fourth carrier film 932 and a long polarizing film 931 (corresponding to the fourth optical film) placed on the fourth carrier film 932 and having an absorption axis in the longitudinal direction. In this embodiment, as shown in FIG. 7A, the long λ/4 retardation film 711 has a long main film part 711a and a pressure-sensitive adhesive 711b. As shown in FIG. 7B, the long λ/2 retardation film 821 has a long main film part 821a and a pressure-sensitive adhesive 821b. As shown in FIG. 7C, the long polarizing film 931 has a long main film part 931a and a pressure-sensitive adhesive 931b.

As shown in FIG. 6, the system 600 of this embodiment for continuously manufacturing an organic EL display panel includes a series of feed units X for feeding an organic EL cell EL and an organic EL display panel OEL, a first optical film supply unit 601, a first bonding unit 681, a second optical film supply unit 602, a second bonding unit 682, a fourth optical film supply unit 603, and a fourth bonding unit 683.

(Feed Units)

The feed units X are configured to feed the organic EL cell EL and the organic EL display panel OEL. The feed units X include a plurality of feed rollers X1, a suction plate, and other components. Although described in detail later, the feed units X in this embodiment also include a first orientation changing unit 675 provided between the first bonding unit 681 and the second bonding unit 682 for interchanging the directions of the short and long sides of the organic EL cell EL, to which a λ/4 retardation film 7111 has been bonded, relative to the direction in which the organic EL cell EL is fed. The feed units X also include a second orientation changing unit 676 provided between the second bonding unit 682 and the fourth bonding unit 683 for interchanging the directions of the short and long sides of the organic EL cell EL, to which the λ/4 retardation film 7111 and then a λ/2 retardation film 8211 have been bonded, relative to the direction in which the organic EL cell EL is fed.

(First Optical Film Supply Unit)

The first optical film supply unit 601 is configured to perform a process including unwinding the first long multilayer optical film 710, which has a width corresponding to the short side of the organic EL cell EL, from the first optical film roll 7, cutting the long λ/4 retardation film 711 in the transverse direction at intervals corresponding to the long side of the organic EL cell EL to form a λ/4 retardation film 7111; and supplying the resulting λ/4 retardation film 7111 to the first bonding unit 681. In this embodiment, the first optical film supply unit 601 includes a first unwinding unit 601a, a first cutting unit 641, a first tension control unit 651, a first peeling unit 661, a first take-up unit 671, and a plurality of feed roller units.

The first unwinding unit 601a has an unwinding shaft, on which the first optical film roll 7 is mounted, and is configured to unwind the first long multilayer optical film 710 from the first optical film roll 7. The first unwinding unit 601a may have two unwinding shafts. This makes it possible to rapidly join a film to another film from a roll mounted on another unwinding shaft without replacing the roll 7 with new one.

The cutting unit 641 includes cutting means 641a and suction means 641b and is configured to half cut the first long multilayer optical film 710 in the transverse direction at intervals corresponding to the long side of the organic EL cell EL (namely, to cut the long λ/4 retardation film 711 in the transverse direction without cutting the first carrier film 712). In this embodiment, the first cutting unit 641 is configured to perform a process including cutting the long λ/4 retardation film 711 (the main film part 711*a* and the pressure-sensitive adhesive 711*b*) in the transverse direction using the cutting means 641*a* while fixing the first long multilayer optical film 710 by sucking it from the first carrier film 712 side with the suction means 641*b*, so that a λ/4 retardation film 7111 of a size corresponding to that of the organic EL cell EL is formed on the first carrier film 712. The cutting means 641*a* may be a cutter, a laser, or a combination thereof.

The first tension control unit 651 has the function of maintaining a tension on the first long multilayer optical film 710. In this embodiment, a non-limiting example of the first tension control unit 651 includes dancer rolls.

The first peeling unit 661 is configured to peel off the λ/4 retardation film 7111 from the first carrier film 712 by folding back the first long multilayer optical film 710 with the first carrier film 712 inside. The first peeling unit 661 may include a wedge-shaped member, rollers, and other components.

The first take-up unit 671 is configured to take up the first carrier film 712 from which the λ/4 retardation film 7111 is peeled off. The first take-up unit 671 has a take-up shaft on which a roll for taking up the first carrier film 712 is mounted.

(First Bonding Unit)

The first bonding unit 681 is configured to perform a process including bonding the λ/4 retardation film 7111 (peeled off by the first peeling unit 661) to the viewer side ELb of the organic EL cell EL with the pressure-sensitive adhesive 711*b* interposed therebetween while feeding the organic EL cell EL in a direction parallel to the long side of the organic EL cell EL, which is fed by the feed units X, wherein the λ/4 retardation film 7111 is supplied by the first optical film supply unit 601, and bonding the λ/4 retardation film 7111 is started from the short side of the organic EL cell EL and performed along the direction in which the λ/4 retardation film 7111 is supplied (or along the direction of the long side of the organic EL cell EL). The first bonding unit 681 includes a pair of bonding rollers 681*a* and 681*b*, in which at least one of the bonding rollers 681*a* and 681*b* is a driving roller.

(Second Optical Film Supply Unit)

The second optical film supply unit 602 is configured to perform a process including unwinding the second long multilayer optical film 820, which has a width corresponding to the long side of the organic EL cell EL, from the second optical film roll 8, cutting the long λ/2 retardation film 821*a* in the transverse direction at intervals corresponding to the short side of the organic EL cell EL to form a λ/2 retardation film 8211; and supplying the resulting λ/2 retardation film 8211 to the second bonding unit 682. In this embodiment, the second optical film supply unit 602 includes a second unwinding unit 602*a*, a second cutting unit 642, a second tension control unit 652, a second peeling unit 662, a second take-up unit 672, and a plurality of feed roller units. The second unwinding unit 602*a*, the second cutting unit 642, the second tension control unit 652, the second peeling unit 662, and the second take-up unit 672 have the same configuration and function as the first unwinding unit 601*a*, the first cutting unit 641, the first tension control unit 651, the first peeling unit 661, and the first take-up unit 671, respectively.

(Second Bonding Unit)

The second bonding unit 682 is configured to perform a process including bonding the λ/2 retardation film 8211 (peeled off by the second peeling unit 662) to the λ/4 retardation film 7111 on the viewer side ELb of the organic EL cell EL with the pressure-sensitive adhesive 821*b* interposed therebetween while feeding the organic EL cell EL in a direction parallel to the short side of the organic EL cell EL, which is fed by the feed units X, wherein the λ/2 retardation film 8211 is supplied by the second optical film supply unit 602, and bonding the λ/2 retardation film 8211 is started from the long side of the organic EL cell EL and performed along the direction in which the λ/2 retardation film 8211 is supplied (or along the direction of the short side of the organic EL cell EL). The second bonding unit 682 includes a pair of bonding rollers 682*a* and 682*b*, in which at least one of the bonding rollers 682*a* and 682*b* is a driving roller.

(First Orientation Changing Unit)

In this embodiment, the feed units X include a first orientation changing unit 675 provided between the first bonding unit 681 and the second bonding unit 682. The orientation changing unit 675 is configured to interchange the directions of the short and long sides of the organic EL cell EL, to which the λ/4 retardation film 711*a* has been bonded, relative to the direction in which the organic EL cell EL is fed. In this embodiment, the first orientation changing unit 675 includes a rotation unit for horizontally rotating the organic EL cell EL by 90° while sucking it. When the first orientation changing unit 675 is provided, the long λ/4 retardation film and the long λ/2 retardation film can be bonded, in directions relatively perpendicular to each other, to the organic EL cell EL without arranging the lines for feeding the long λ/4 retardation film and the long λ/2 retardation film perpendicular to each other, so that the space required for the apparatus can be reduced.

(Fourth Optical Film Supply Unit)

The fourth optical film supply unit 603 is configured to perform a process including unwinding the fourth long multilayer optical film 920, which has a width corresponding to the short side of the organic EL cell EL, from the fourth optical film roll 9, cutting the long polarizing film 931*a* in the transverse direction at intervals corresponding to the long side of the organic EL cell EL to form a polarizing film 9311; and supplying the resulting polarizing film 9311 to the fourth bonding unit 683. In this embodiment, the fourth optical film supply unit 603 includes a fourth unwinding unit 603*a*, a fourth cutting unit 643, a fourth tension control unit 653, a fourth peeling unit 663, a fourth take-up unit 673, and a plurality of feed roller units. The fourth unwinding unit 603*a*, the fourth cutting unit 643, the fourth tension control unit 653, the fourth peeling unit 663, and the fourth take-up unit 673 have the same configuration and function as the first unwinding unit 601*a*, the first cutting unit 641, the first tension control unit 651, the first peeling unit 661, and the first take-up unit 671, respectively.

(Fourth Bonding Unit)

The fourth bonding unit 683 is configured to perform a process including bonding the polarizing film 9311 (peeled off by the fourth peeling unit 663) to the λ/2 retardation film 8211 on the viewer side ELb of the organic EL cell EL with the pressure-sensitive adhesive 931*b* interposed therebetween while feeding the organic EL cell EL in a direction parallel to the long side of the organic EL cell EL, which is fed by the feed units X, wherein the polarizing film 9311 is supplied by the fourth optical film supply unit 603, and bonding the polarizing film 9311 is started from the short side of the organic EL cell EL and performed along the direction in which the polarizing film 9311 is supplied (or along the direction of the long side of the organic EL cell EL). The third bonding unit 683 includes a pair of bonding rollers 683a and 683b, in which at least one of the bonding rollers 683a and 683b is a driving roller.

(Second Orientation Changing Unit)

In this embodiment, the feed units X also include a second orientation changing unit 676 provided between the second bonding unit 682 and the fourth bonding unit 683. The orientation changing unit 676 is configured to interchange the directions of the short and long sides of the organic EL cell EL, to which the λ/4 retardation film 7111 and the λ/2 retardation film 8211 have been bonded, relative to the direction in which the organic EL cell EL is fed. In this embodiment, the second orientation changing unit 676 includes a rotation unit for horizontally rotating the organic EL cell EL by 90° while sucking it. When the second orientation changing unit 676 is provided, the long λ/2 retardation film and the long polarizing film can be bonded, in directions relatively perpendicular to each other, to the organic EL cell EL without arranging the lines for feeding the long λ/2 retardation film and the long polarizing film perpendicular to each other, so that the space required for the apparatus can be reduced.

Using the system of this embodiment for continuously manufacturing an organic EL display panel, the λ/4 retardation film, the λ/2 retardation film, and the polarizing film, which are not able to be continuously laminated in the form of long strips, can be each continuously supplied from the roll, and each bonded to the organic EL cell along the original direction in which each film is supplied from each roll. In addition, the λ/4 and λ/2 retardation films can be bonded, in directions relatively perpendicular to each other, to the organic EL cell, and the λ/2 retardation film and the polarizing film can also be bonded, in directions relatively perpendicular to each other, to the organic EL cell. Thus, the films can be continuously laminated to the viewer side of the organic EL cell at high yield and high speed. This makes possible high-yield, high-speed, continuous production of organic EL display panels each having the λ/4 retardation film, the λ/2 retardation film, and the polarizing film which are laminated in a proper arrangement relationship to form a circularly polarizing film with an anti-reflection function. In this embodiment, the first optical film supply unit, the second optical film supply unit, and the fourth optical film supply unit are so arranged as to supply the λ/4 retardation film, the λ/2 retardation film, and the polarizing film in directions parallel to one another, so that the space occupied by the apparatus can be reduced.

Modifications of Embodiment 3

In this embodiment, the first bonding unit, the second bonding unit, and the fourth bonding unit are configured to bond the λ/4 retardation film, the λ/2 retardation film, and the polarizing film to the lower side of the organic EL cell. However, this is non-limiting. Alternatively, any two of the films may be bonded to the upper side of the organic EL cell, and the remaining one may be bonded to the lower side of the organic EL cell, or any two of the films may be bonded to the lower side of the organic EL cell, and the remaining one may be bonded to the upper side of the organic EL cell. Alternatively, all the films may be bonded to the upper side of the organic EL cell.

Common Modifications of Embodiments 1 to 3

In Embodiments 1 to 3, each optical film roll used is a roll of a long multilayer optical film including a carrier film and a long optical film placed thereon. This structure of the optical film roll is non-limiting. Alternatively, for example, a roll of a long multilayer optical film including a carrier film and a long optical film placed on the carrier film and having a plurality of score lines each formed in the transverse direction (a roll of a scored optical film) may also be used as needed. If the optical film supply unit is configured to supply the optical film from the scored optical film roll, no cutting unit will be necessary.

In Embodiments 1 to 3, each optical film supply unit is configured to supply the optical film by a process including half-cutting the long multilayer optical film in the transverse direction (or cutting the long optical film in the transverse direction without cutting the carrier film) and peeling off the optical film from the carrier film. This configuration is non-limiting. Alternatively, for example, each optical film supply unit may also be configured to supply the optical film by a process including full-cutting the long multilayer optical film in the transverse direction (or cutting the carrier film and the long optical film in the transverse direction) and peeling off the cut piece of the carrier film from the cut piece of the multilayer optical film. To continuously supply optical films at high speed from optical film rolls so that optical display panels can be manufactured at high speed and improved productivity, it is particularly preferred to configure each optical film supply unit as shown in Embodiments 1 to 3.

In Embodiments 1 to 3, the cutting unit is configured to perform a process including cutting the long optical film in the transverse direction to form, on the carrier film, an optical film of a size corresponding to the size of the optical cell. To improve yield, however, the cutting unit may be configured to perform a process including cutting (skip-cutting) the long optical film in the transverse direction in such a manner that defective parts of the long optical film are separated and in such a manner that an optical film of a size corresponding to the size of the optical cell (a non-defective optical film suitable to be bonded to the optical cell) is formed on the carrier film, and cutting the long optical film in such a manner a defect-containing optical film is made smaller than the size of the optical cell (more preferably, made as small as possible). As mentioned above, when the optical films used are not able to be continuously laminated in the form of long strips, pieces of one of the optical films (e.g., pieces of linearly polarized light separating film) may be placed on the other type of long optical film (e.g., polarizing film). In this case, a part (boundary region) where the piece of one of the optical films is not placed necessarily and regularly occurs in the other type of long optical film. In this case, even if the multilayer optical film formed in such a manner is subjected to the skip cutting in the transverse direction, the boundary region regularly present in the multilayer optical film must be handled as a defective part, which will make it difficult to improve yield. In contrast, according to the invention, the first optical film (e.g., a polarizing film) and the second optical film (e.g., a linearly polarized light separating film), which are not able to be continuously laminated in the form of long strips, can be each continuously supplied from a roll and bonded to the optical cell, and each optical film supply unit can be configured to perform a process including skip-cutting the long optical film in the transverse direction and supplying the resulting optical film from the optical film roll, which makes it possible to effectively improve yield. For example, the first cutting unit may be configured to perform a process including cutting (skip-cutting) the long first optical film in the transverse direction in such a manner that defective parts of the first long optical film are separated, and the second cutting unit may be configured to perform a process including transversely cutting the second long optical film into pieces with a constant length corresponding the size of the optical cell. Such configurations may be combined as needed. In the invention, each optical film may be a roll of a laminate of a carrier film and a long optical film, which is placed on the carrier film and has a plurality of score lines transversely formed so as to separate defective parts and so as to form, on the carrier film, pieces of optical film with a size corresponding to that of the optical cell (non-defective pieces of optical film each suitable to be bonded to the optical cell) and defect-containing pieces of optical film made smaller than the size of the optical cell (more preferably, made as small as possible) (a roll of a scored optical film). Using such a roll, the yield can also be effectively improved. The defect-containing piece of optical film is preferably handled so as not to be bonded to the optical cell, for example, by being peeled off from the carrier film and discharged or by being taken up on the take-up unit together with the carrier film. This also applies to a case where the scored optical film roll is used or a case where the process of full-cutting the long multilayer optical film in the transverse direction is used.

Embodiments 1 to 3 have been described with reference to an example where the optical cell and the optical display panel each have a horizontally-long rectangular shape. It will be understood that the optical cell and the optical display panel may each have any shape as long as they are each shaped to have a pair of opposite sides and another pair of opposite sides.

DESCRIPTION OF REFERENCE SIGNS

<Optical Film>

For example, the main part of a polarizing film includes a polarizer (generally about 1 to about 80 μm in thickness) and a polarizer-protecting film or films (generally about 1 to about 500 μm in thickness) formed on one or both sides of the polarizer with or without an adhesive. The polarizer usually has an absorption axis in the stretched direction. A polarizing film including a long polarizer having an absorption axis in the longitudinal direction is also called an "MD polarizing film," and a polarizing film including a long polarizer having an absorption axis in the transverse direction is also called a "TD polarizing film." The main part of the film may further include any other film such as a retardation film such as a λ/4 plate or a λ/2 plate (generally 10 to 200 μm in thickness), a viewing angle compensation film, a brightness enhancement film, or a surface protecting film. For example, the multilayer optical film may have a thickness in the range of 10 μm to 500 μm.

For example, the main part of a linearly polarized light separating film is a reflective polarizing film of a multilayer structure having a reflection axis and a transmission axis. For example, the reflective polarizing film can be obtained by alternately stacking a plurality of polymer films A and B made of two different materials and stretching them. The refractive index of only the material A is changed and increased in the stretching direction, so that birefringence is produced, in which a reflection axis is formed in the stretching direction where there is a difference in refractive index at the material A-B interface, and a transmission axis is formed in the direction (non-stretching direction) where no difference in refractive index is produced. This reflective polarizing film has a transmission axis in its longitudinal direction and a reflection axis in its transverse direction (widthwise direction). A commercially available product may be directly used as the reflective polarizing film, or a commercially available product may be subjected to secondary working (such as stretching) and then used as the reflective polarizing film. Examples of the commercially available product include DBEF (trade name) manufactured by 3M Company and APF (trade name) manufactured by 3M Company.

The pressure-sensitive adhesive may be of any type such as an acryl-based pressure-sensitive adhesive, a silicone pressure-sensitive adhesive, or a urethane pressure-sensitive adhesive. For example, the thickness of the pressure-sensitive adhesive layer is preferably in the range of 10 μm to 50 μm. The peel strength between the pressure-sensitive adhesive and the carrier film is typically, but not limited to, 0.15 (N/50 mm sample width). The peel strength can be measured according to JIS Z 0237.

(Carrier Film)

For example, the carrier film to be used may be a conventionally known film such as a plastic film (e.g., a polyethylene terephthalate-based film or a polyolefin-based film). According to conventional techniques, any appropriate film such as a film coated with an appropriate release agent such as a silicone, long-chain alkyl, or fluoride release agent, or molybdenum sulfide may also be used as needed. In general, the carrier film is also called a release film (separator film).

(Liquid Crystal Cell and Liquid Crystal Display Panel)

The liquid crystal cell includes a pair of substrates (a first substrate (viewer side) Pa and a second substrate (back side) Pb) opposed to each other and a liquid crystal layer sealed between the substrates. The liquid crystal cell to be used may be of any type. To achieve high contrast, it is preferable to use a vertical alignment (VA) mode liquid crystal cell or an in-plane switching (IPS) mode liquid crystal cell. The liquid crystal display panel includes the liquid crystal cell, a polarizing film or films bonded to one or both sides of the liquid crystal cell, and optionally a driving circuit incorporated therein.

(Organic EL Cell and Organic EL Display Panel)

The organic electroluminescent (EL) cell includes a pair of electrodes and an electroluminescent layer sandwiched between the electrodes. The organic EL cell to be used may be of any type, such as a top emission type, a bottom emission type, or a double emission type. The organic EL display panel includes the organic EL cell, a polarizing film or films bonded to one or both sides of the organic EL cell, and optionally a driving circuit incorporated therein.

DESCRIPTION OF REFERENCE SIGNS 1, 2, 3, 4, 5, 7, 8, 9 Optical film roll
101, 102, 103, 401, 402, 601, 602, 603 Optical film supply unit
81, 82, 83, 481, 482, 681, 682, 683 Bonding unit
P Liquid crystal cell
LD Liquid crystal display panel
EL Organic EL cell
OEL Organic EL display panel
X Feed unit

The invention claimed is:
1. A method for continuously manufacturing an optical display panel comprising an optical cell, and a first polarizing film and a linearly polarized light separating film which are placed in this order on a back side of the optical cell, the method comprising:

a first bonding step comprising providing a first polarizing film obtained by transversely cutting a first long polarizing film having an absorption axis in its longitudinal direction, supplying the first polarizing film from a first optical film roll, and bonding the first polarizing film to a back side of the optical cell while feeding the optical cell, wherein bonding the first polarizing film is started from one of a pair of opposite sides of the optical cell and performed along a direction in which the first polarizing film is supplied; and a second bonding step comprising providing a linearly polarized light separating film obtained by transversely cutting a long linearly polarized light separating film having a reflection axis in its transverse direction, supplying the linearly polarized light separating film from a second optical film roll, and bonding the linearly polarized light separating film onto the first polarizing film bonded to the back side of the optical cell, while feeding the optical cell, wherein bonding the linearly polarized light separating film is started from one of another pair of opposite sides of the optical cell and performed along a direction in which the linearly polarized light separating film is supplied.

2. The method for continuously manufacturing an optical display panel according to claim 1, further comprising an orientation changing step between the first bonding step and the second bonding step, the orientation changing step comprising interchanging the direction of a pair of opposite sides of the optical cell and the direction of another pair of opposite sides of the optical cell relative to a direction in which the optical cell is fed.

3. The method for continuously manufacturing an optical display panel according to claim 1, further comprising a third bonding step comprising providing a second polarizing film obtained by transversely cutting a second long polarizing film having an absorption axis in its longitudinal direction, supplying the second polarizing film from a third optical film roll, and bonding the second polarizing film to a viewer side of the optical cell while feeding the optical cell, wherein bonding the second polarizing film is started from one of another pair of opposite sides of the optical cell and performed along a direction in which the second polarizing film is supplied.

4. The method for continuously manufacturing an optical display panel according to claim 3, wherein the first polarizing film, the linearly polarized light separating film, and the second polarizing film are supplied in directions parallel to one another.

5. The method for continuously manufacturing an optical display panel according to claim 1, further comprising a third bonding step comprising taking and supplying a second polarizing film from a container containing pieces of second polarizing film and bonding the second polarizing film to a viewer side of the optical cell while feeding the optical cell, wherein bonding the second polarizing film is performed along a direction in which the second polarizing film is supplied.

6. The method for continuously manufacturing an optical display panel according to claim 1, wherein the optical cell is a VA or IPS mode liquid crystal cell.

7. A method for continuously manufacturing an optical display panel comprising an optical cell, and a first optical film and a second optical film which are placed in this order on one side of the optical cell, the method comprising:

a first bonding step comprising providing a first optical film obtained by transversely cutting a first long optical film, supplying the first optical film from a first optical film roll, and bonding the first optical film to one side of the optical cell while feeding the optical cell, wherein bonding the first optical film is started from one of a pair of opposite sides of the optical cell and performed along a direction in which the first optical film is supplied; and a second bonding step comprising providing a second optical film obtained by transversely cutting a second long optical film, supplying the second optical film from a second optical film roll, and bonding the second optical film onto the first optical film bonded to the one side of the optical cell, while feeding the optical cell, wherein bonding the second optical film is started from one of another pair of opposite sides of the optical cell and performed along a direction in which the second optical film is supplied.

8. The method for continuously manufacturing an optical display panel according to claim 7, further comprising an orientation changing step between the first bonding step and the second bonding step, the orientation changing step comprising interchanging the direction of a pair of opposite sides of the optical cell and the direction of another pair of opposite sides of the optical cell relative to a direction in which the optical cell is fed.

9. The method for continuously manufacturing an optical display panel according to claim 7, wherein the first optical film and the second optical film are supplied in directions parallel to each other.

10. The method for continuously manufacturing an optical display panel according to claim 7, wherein
the first long optical film is a long retardation film comprising a laminate of a long λ/4 retardation film having a slow axis in its longitudinal direction and a long λ/2 retardation film having a slow axis in a direction making an angle of 67.5 degrees with its longitudinal direction, and
the second long optical film is a long polarizing film having an absorption axis in its longitudinal direction.

11. The method for continuously manufacturing an optical display panel according to claim 7, further comprising a fourth bonding step comprising providing a fourth optical film obtained by transversely cutting a long fourth optical film, supplying the fourth optical film from a fourth optical film roll, and bonding the fourth optical film onto the second optical film bonded to the one side of the optical cell, while feeding the optical cell, wherein bonding the fourth optical film is started from one of a pair of opposite sides of the optical cell and performed along a direction in which the fourth optical film is supplied.

12. The method for continuously manufacturing an optical display panel according to claim 11, further comprising a second orientation changing step between the second bonding step and the fourth bonding step, the second orientation changing step comprising interchanging the direction of a pair of opposite sides of the optical cell and the direction of another pair of opposite sides of the optical cell relative to a direction in which the optical cell is fed.

13. The method for continuously manufacturing an optical display panel according to claim 11, wherein the first optical film, the second optical film, and the fourth optical film are supplied in directions parallel to one another.

14. The method for continuously manufacturing an optical display panel according to claim 11, wherein
the first long optical film is a long λ/4 retardation film having a slow axis in its transverse direction, the second long optical film is a long λ/2 retardation film having a slow axis in a direction making an angle of 67.5 degrees with its longitudinal direction, and the long fourth optical film is a long polarizing film having an absorption axis in its longitudinal direction.

15. The method for continuously manufacturing an optical display panel according to claim 7, wherein the optical cell is a liquid crystal cell or an organic electroluminescent cell.

* * * * *